(12) United States Patent
Lopez-Nieto

(10) Patent No.: US 11,250,060 B2
(45) Date of Patent: Feb. 15, 2022

(54) GRAPHIC REPRESENTATION OF THE COMPOSITION OF A DATABASE AND SELECTION TOOL

(71) Applicant: Carlos E. Lopez-Nieto, Gainesville, FL (US)

(72) Inventor: Carlos E. Lopez-Nieto, Gainesville, FL (US)

(*) Notice: Subject to any disclaimer, the term of this patent is extended or adjusted under 35 U.S.C. 154(b) by 124 days.

(21) Appl. No.: 16/839,382

(22) Filed: Apr. 3, 2020

(65) Prior Publication Data

US 2021/0311993 A1    Oct. 7, 2021

(51) Int. Cl.
  *G06F 16/90* (2019.01)
  *G06F 16/901* (2019.01)
  *G06F 16/906* (2019.01)
  *G06F 16/904* (2019.01)

(52) U.S. Cl.
  CPC ........ *G06F 16/9024* (2019.01); *G06F 16/904* (2019.01); *G06F 16/906* (2019.01)

(58) Field of Classification Search
  CPC ... G06F 16/9024; G06F 16/906; G06F 16/904
  See application file for complete search history.

(56) References Cited

U.S. PATENT DOCUMENTS

| 8,605,089 | B1 | 12/2013 | Heckerman et al. | |
| 2005/0223337 | A1* | 10/2005 | Wheeler | G06T 19/00 715/806 |
| 2008/0235190 | A1* | 9/2008 | Zhao | G06F 16/334 |
| 2015/0310647 | A1* | 10/2015 | Matange | G06Q 10/00 345/440 |
| 2018/0314751 | A1 | 11/2018 | Filippi et al. | |
| 2019/0272372 | A1 | 9/2019 | Ananthanpillai et al. | |

OTHER PUBLICATIONS

Lin, Y-R. et al. "UnTangle: Visual Mining for Data with Uncertain Multi-labels via Triangle Map" In: *2014 IEEE International Conference on Data Mining*, Dec. 14-17, 2014, pp. 1-11, [online] [retrieved on May 19, 2021 (May 19, 2021)] Retrieved from the Internet<URL: https://ieeexplore.ieee.org/documenU7023351>.
Written Opinion in International Application No. PCT/US2021/23795, dated Jun. 25, 2021, pp. 1-4.

* cited by examiner

*Primary Examiner* — Baoquoc N To
(74) *Attorney, Agent, or Firm* — Saliwanchik, Lloyd & Eisenschenk

(57) ABSTRACT

A pictograph representing at least a portion of the composition of a media library. Pictographs can be a physical object or a computer graphic shown on a screen. Icons on the pictograph represent descriptors tagged to items in the media library. A Strength of Association Ratio (SAR) can be calculated for pairs of descriptors. The SARs can be utilized to calculate Angles of Association (AA) that are utilized in a Triangulation Method to position an icon on an equilateral triangle to create a pictograph. Pictographs can be manipulated to create expanded or more complex 2-dimensional or 3-dimensional pictographs. A pictograph can be presented on a screen and utilized as an improved selection tool for locating items in the media library represented by the pictograph.

27 Claims, 25 Drawing Sheets
(23 of 25 Drawing Sheet(s) Filed in Color)

GRAPHIC REPRESENTATION OF THE COMPOSITION OF A DATABASE AND SELECTION TOOL

BACKGROUND OF INVENTION

Media content comes in a variety of formats, including movies, books, magazines, video, music, and television. Numerous media services also provide access to libraries of different types of media. Locating a specific item in the library of a particular media service usually involves a search based on the details, classifications, characteristics and other details and data regarding the item. Thus, the effectiveness of a search can depend on the number and accuracy of the data ascribed to an item in the library. Oftentimes, the items in a media library are classified into general categories and the user can perform a search of the different categories to find an item. For example, book and movie media service libraries can have hundreds of items that are classified by descriptive characteristics into different groups such as comedy, drama, action, science fiction, documentary, musical, history, biography, etc. Some media services may have a few general categories and others may have multiple categories and subcategories. Categories can be based on qualitative and quantitative information such as genre, narrative elements, year of release, rating, box office or sales totals or revenue, author, and other information pertaining to each item.

The granularity of categories and subcategories used to classify items can determine the precision of a search that can be conducted in a media library, but can also increase the amount of time spent searching for a particular item or type of item. A search with multiple specific criteria may return precise results or no results. Conversely, a search with fewer or more general criteria can return multiple items that may or may not be relevant. If search results do not return the expected items, it can be difficult to determine how to modify the search criteria to obtain the desired results. Further, without some idea of the overall composition of a media library, it can be difficult to determine if a particular classification of items is available in that media library. Even if all of some of the library composition is known, classifications based on descriptive characteristics may not inform of the complexity and interrelatedness that can exist between categories of items in that library. For example, a search for items classified as Adventure and Mystery would return one set of results and a search for items classified as Adventure and Fantasy would return a different set of results. The results of each search may not inform the user about other closely related items in the media library, such as items classified as Adventure and Thriller. Thus, additional searches may be required to narrow down the field of results. It would be helpful if a media library could be presented in a format that informed a user about the composition of a media library prior to conducting a search. Ideally, the user would be presented with information that can be intuitively understood and that informs not only about the composition, but also relatedness between the classifications of items in the media library.

BRIEF SUMMARY

In accordance with the invention, the problem of presenting all or some part of the composition of a media library is solved by presenting a pictograph that visually embodies the contents of a media library. Items in the media library can be tagged with descriptors related to characteristics or data related to the items. A descriptor can include any information that relates to or describes the item, including, but not limited to, various qualitative or quantitative characteristics, statistics, other metadata or a combination thereof. A pictograph can include a plurality of icons that are representative of the descriptors. Icons in closer proximity on a pictograph can be interpreted to have a closer association in the media library. In other words, proximity can indicate association between descriptors in the media library. The icons can also convey additional information, such as, for example, the frequency in which items are tagged with each descriptor. Different sections or areas of a pictograph can also be associated with particular descriptors. Icons on a pictograph can also be assigned colors, shapes, and sizes to convey additional information. A pictograph can also be used to determine what types of items are in the media library and be used to understand any association or similarities between them.

Utilizing the number of items associated with each of the descriptors, embodiments of the subject invention can employ a Strength of Association equation to obtain a Strength of Association Ratio (SAR) between any two descriptors. The SARs are based on the number of items tagged with the respective descriptors in the media library. The SARs can represent how often items tagged with one descriptor are associated with items tagged with another descriptor.

Embodiments of the subject invention utilize a pictograph having a frame that can define the shape, outline, or general structure of a pictograph. The frame can comprise at least one angle between 0° and about 180°. In one embodiment, the subject invention utilizes a pictograph frame comprising at least one angle between 0° and 60°. This can include, but is not limited to, shapes that are circular, semi-circular, square, triangular, rectangular, or combinations thereof. In a specific embodiment, a pictograph frame is based on a triangle. In a more specific embodiment, a pictograph frame is based on an equilateral triangle, where each internal angle is 60°. In a further embodiment, a Triangulation Method is used to position icons on a 2-dimensional pictograph using the SAR in an Angle of Association (AA) equation. In one embodiment, multiple triangles can be used to create a 2-dimensional or 3-dimensional pictograph frame. In a particular embodiment, a 2-dimensional pictograph of equilateral triangles is manipulated to create a 3-dimensional tetrahedron pictograph. In a further embodiment, multiple tetrahedron pictographs can be manipulated to form complex 3-dimensional pictographs.

In still further embodiments, combinatorics methods are used to create complex 2- or 3-dimensional pictographs. Combinatorics pertains to a process of utilizing a fixed number of elements from a set of elements and creating permutations. For example, one or more sections or areas of a pictograph can be manipulated to create icons that represent additional combinations of descriptors on the pictograph. Manipulations can include geometric transformations of a pictograph or some portion thereof. Such geometric transformations can include, but are not limited to, bending, folding, rotating, turning or flipping, reflecting, layering, projecting, resizing, distributing, aligning, calculating midpoints between already positions icons, or any other manipulation that leads to an algorithmic distortion of a pictograph or some portion thereof to create different spatial arrangements of icons.

In one embodiment, geometric transformation methods are utilized to further manipulate pictographs, so as to position icons thereon that represent complex descriptors.

These combinatorics methods can create pictographs having more complex descriptors positioned. This can further provide a more granular pictograph and allows items in a media library to be tagged with multiple descriptors, which can be more precise. In one embodiment, a generalized pictograph can be created utilizing all or a subset of the individual descriptors employed in tagging items in a media library. Icons can be positioned on a pictograph utilizing the Strength of Association and the Triangulation methods. The icons on the pictograph can then be manipulated by combinatorics methods to create additional icons related to and/or based on the icons on the pictograph. In specific embodiments, the pictograph and one or more icons are manipulated using reflection, rotation, and midpoint methods to create complex descriptors on a pictograph.

In a further embodiment, a pictograph can be used to provide each item in a media library with a badge. A badge can include one or more icons that represent the descriptors used to tag that item. In one embodiment, a badge resembles the frame of the pictograph that includes only the icons associated with the particular item. Thus, a badge can provide a visual cue as to the characteristics of an item. Together, badges and pictographs can assist is discerning and identifying item(s) that may be of interest or item(s) that may be similar to those of interest in a medial library.

In certain embodiments, a pictograph can be utilized as an interface between a user and a media library. A pictograph can be presented in a variety of formats, including, but not limited to a 2- or 3-dimensional image and a 2- or 3-dimensional construct. The composition of media libraries can be compared by examining their respective pictographs. A pictograph construct can be a 2- or 3-dimensional object. A pictograph construct can also be an image presented electronically on a screen, such as a computer, television, telephone, tablet or other electronic device. In one embodiment, a pictograph is a selection tool for accessing or acquiring an item or a list of items. When presented electronically, selecting an icon on a pictograph can present on a screen a list or other representation of those items in the media library tagged with the selected one or more descriptors represented by the icon(s). In a further embodiment, selecting an icon(s) on the pictograph can present a portion of the pictograph that includes additional information or an extended portion of the pictograph with additional or alternative icons representative of different additional, compound, or alternative descriptors associated with the same or other items in the media library. Alternatively, selecting one or more icons on a pictograph can present a list of items that relate to or are associated with the one or more selected icon(s).

It should be noted that this Brief Summary is provided to generally introduce the reader to one or more select concepts described below in the Detailed Disclosure in a simplified form. This Summary is not intended to identify key and/or required features of the claimed subject matter. Other aspects and further scope of applicability of the present invention will also become apparent from the detailed descriptions given herein. It should be understood, however, that the detailed descriptions, while indicating preferred embodiments of the invention, are given by way of illustration only, since various changes and modifications within the spirit and scope of the invention will become apparent from such descriptions. The invention is defined by the claims below.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. The drawings presented herein may not be drawn to scale and any reference to dimensions or scale in the drawings or the following description is specific to the embodiments disclosed. Any variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the use of the accompanying drawings in which:

This patent or application file contains at least one drawing executed in color. Copies of this patent or patent application publication with color drawing(s) will be provided by the Office upon request and payment of the necessary fee.

FIG. 4A is a table that demonstrates Strength of Association Ratios calculated for a plurality of descriptors used to tag items in a media library.

FIG. 4B is a table that shows examples of total counts obtained for each descriptor used to tag items in a media library shown in FIG. 4A.

FIG. 17A illustrates the reflection method and FIG. 17B illustrates one example of a partial pictograph with reflected icons.

FIG. 20B shows items, as presented as a list on a screen, from a media library obtained by selecting icons on a pictograph with a badge next to each item.

DETAILED DISCLOSURE

Figure 1:
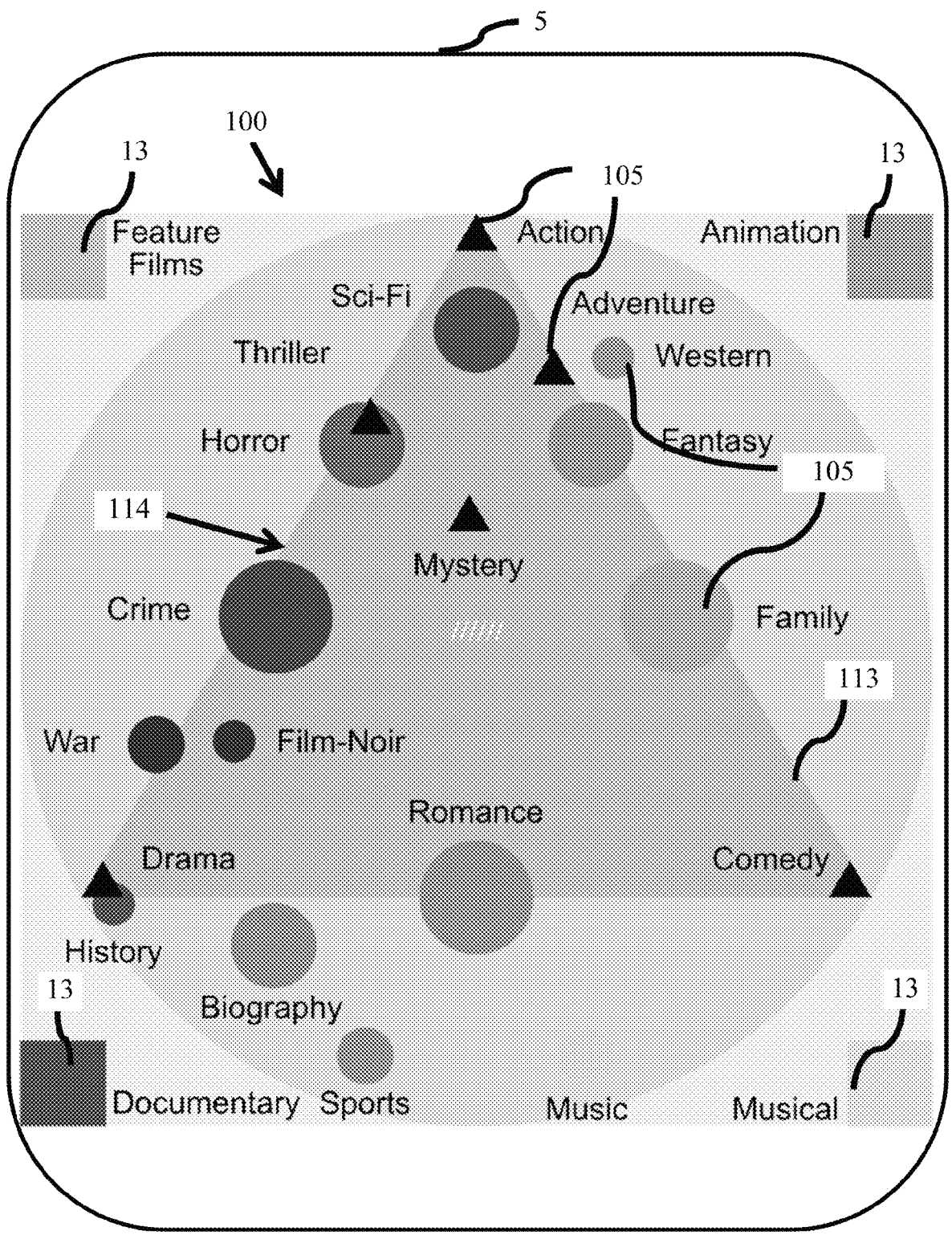
FIG. 1 represents one embodiment of a pictograph, according to the subject invention. The position of icons on the pictograph can convey information about the composition of a media library based on the locations of icons that represent descriptors associated with items in the media library. As shown, icons can have different shapes, colors, and sizes to indicate additional information, such as, for example, quantitative information about the items that make up the composition of a media library and or descriptors. The pictograph shown here has icons that represent narrative elements (triangles), genres (circles) and formats (squares) descriptors.

The subject invention pertains to a method for generating a graphic representation of all or some portion of the composition of a media library. More specifically, the subject invention provides embodiments of methods for creating a pictograph that graphically illustrates all or a portion of the composition of a media library and any relationship between items in the media library. The pictograph can be based on descriptors that relate to information about items in the media library. Icons representing the descriptors can be positioned on the pictograph. Proximity of the icons on a pictograph can indicate relatedness between the descriptors, with regard to the items in the media library used to create the pictograph. One or more pictographs can be used to evaluate the composition of a media library. In certain embodiments, a pictograph or combinations of pictographs can be used to select items in the media library.

The following description will disclose that the subject invention is particularly useful for media libraries that contain items of creative work. More specifically, embodiments of the subject invention are particularly useful for media libraries comprising items, such as, for example, movies, films, gaming videos, books, podcasts, music, and television. This does not preclude the methods described herein from being applicable to other types of libraries, databases, or groups of items with associated data. The embodiments of the subject invention could, for example, be utilized to create a pictograph depicting data related to one or more individuals. Thus, a person with skill in the art will be able to recognize numerous other uses that would be applicable to the devices and methods of the subject invention. While the subject application describes, and many of the terms herein relate to, a use for entertainment media libraries, particularly film libraries, other modifications apparent to a person with skill in the art and having benefit of the subject disclosure are contemplated to be within the scope of the present invention.

In the description that follows, a number of terms are utilized related to the subject invention. In order to provide a clear and consistent understanding of the specification and claims, including the scope to be given such terms, the following definitions are provided.

The term "media library" as used herein refers is a collection of items that can be read, viewed, heard, played, or otherwise used or experienced by borrowing, downloading, uploading, or otherwise obtaining access, wherein each item is tagged with at least one descriptor. The composition of a media library can be obtained and used directly, indirectly, physically, or remotely irrespective of the format or file type, from any storage location accessible to a user, which includes content stored on a device, stored in a database, or a physical library, or other location where items can be directly accessed or acquired.

As used herein, the term "descriptor" refers to one or more characteristics, traits, quality, property, features, details, statistic, or other data that relates to, describes, or otherwise represents an item. A descriptor can be qualitative or quantitative or some combination thereof.

As used herein, and unless otherwise specifically stated, the terms "operable communication," "operable connection," "operably connected," "cooperatively engaged" and grammatical variations thereof mean that the particular elements are connected in such a way that they cooperate to achieve their intended function or functions. The "connection" or "engagement" may be direct, or indirect, physical or remote.

The present invention is more particularly described in the following examples that are intended to be illustrative only because numerous modifications and variations therein will be apparent to those skilled in the art. As used in the specification and in the claims, the singular for "a," "an" and "the" include plural referents unless the context clearly dictates otherwise.

Aspects of the invention can be described in the general context of computer-executable instructions, such as program modules, being executed by a computer. Generally, program modules include routines, programs, objects, components, data structures, etc. that perform particular tasks or implement particular abstract data types. Such program modules can be implemented with hardware components, software components, or a combination thereof. Moreover, those skilled in the art will appreciate that the invention can be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, formats, and numerous other details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention can be practiced without these specific details. Computer systems, servers, work stations, and other machines can be connected to one another across a communication medium including, for example, a network or networks.

It should also be understood by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

Reference will be made to the attached figures on which the same reference numerals are used throughout to indicate the same or similar components. With reference to the attached Figures, which show certain embodiments of the subject invention, it can be seen in FIG. 1 that the composition of a media library 10 that contains a plurality of items 12 can be presented as a pictograph 100. The pictograph can have a frame 113 on which one or more descriptors 14, represented by icons 105, can be positioned. One or more descriptors can be mathematically related using a Strength of Association equation to obtain Strength of Association Ratios (SARs). The Strength of Association ratios can further be used in an Angle of Association equation to convert the SARs to angles that can subsequently be used in a Triangulation Method to position icons 105, which represent or correspond to descriptors, on a pictograph. The positions of the icons on the pictograph can further visually provide a relative association between the descriptors with regard to the composition of the media library. In one embodiment, a pictograph is presented in an electronic or computerized format on a screen 5 and used as a selection tool for items in a media library. In certain embodiments, each item can be assigned a badge 200. In specific embodiments, a badge resembles a pictograph with only the one or more icons that are relevant to or tagged to the item, thereby providing a visual cue or depiction of the descriptors of the specific item. Each of these general components can have one or more sub-components, which will be discussed in detail below.

I. Descriptors

Figure 2:
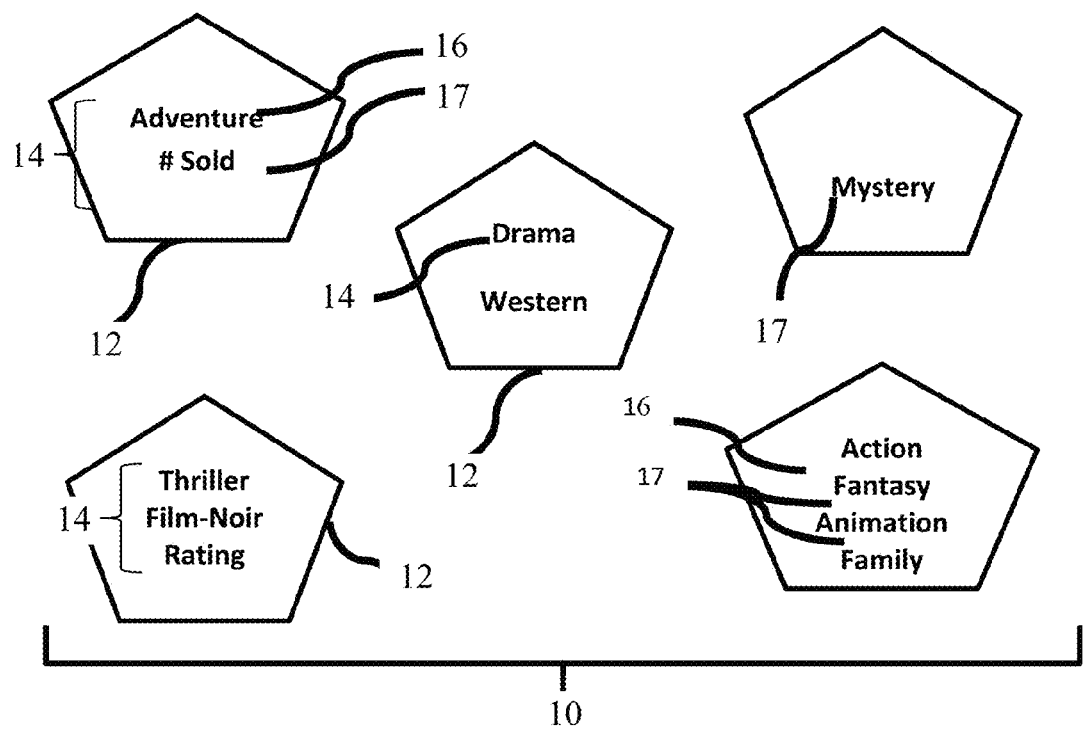
FIG. 2 is a simple representation of a media library with items tagged with various descriptors.

The ability to locate any one or more items in a media library can be dictated by the size and organizational strategy of the media library. Embodiments of the subject invention provide methods and tools by which the composition of a media library 10 is presented in a visual context that informs a user about the items, such as, for example, their quantitative and/or qualitative characteristics, in the media library. In one embodiment, items in a media library are labeled, assigned, associated or otherwise "tagged" with one or more descriptors 14 that correspond or relate to one or more characteristics of the item. The granularity and appearance of a pictograph can depend upon the type and number of descriptors used to tag the items in a media library. The number of descriptors utilized can further determine the number icons 105 that can be positioned on a pictograph. It can be preferable for the number of descriptors to be sufficient to accurately describe items in a media library, so they can be tallied into meaningful divisions. FIG. 2 illustrates a representative example of a media library with items tagged with one or more descriptors 14. Any number of descriptors can be used to tag items. In one embodiment, a pictograph comprises a plurality of icons representing descriptors relevant to a particular type of media library. For any given media library of that type, the pictograph can be modified by adding or removing icons that are not relevant to that particular media library. Thus, users can associate a specific pictograph with a specific type of media library, such that they can discern the composition of any media library of that type by viewing the pictograph.

In one embodiment, a descriptor 14 is a characteristic or other data that describes or characterizes an item 12 in a media library 10. For the purposes of this description, a media library comprising movies, along with descriptors typically related to movies is used herein to illustrate embodiments of the subject invention. It should be understood that the invention is not limited to movie-based media libraries and the methods and devices disclosed herein could be utilized for any media library.

Figure 3:
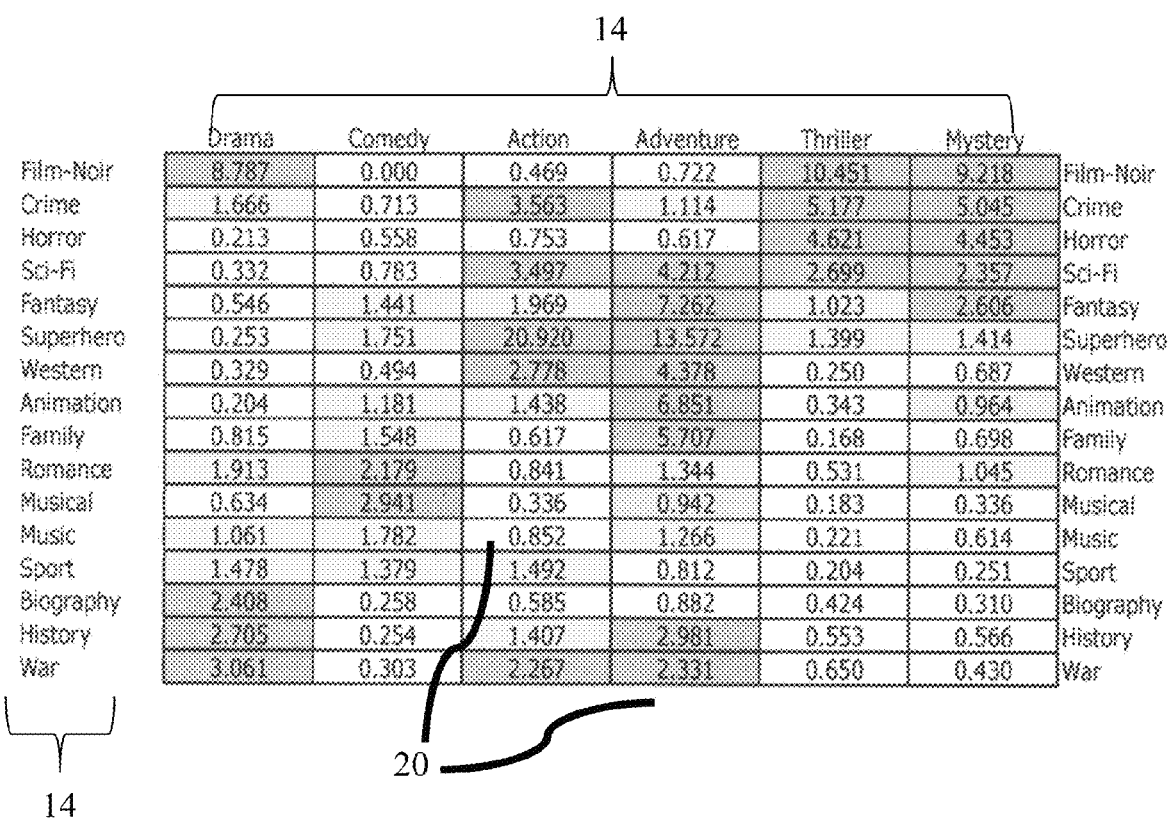
FIG. 3 is a table that demonstrates Strength of Association Ratios calculated for various narrative element descriptors and genre descriptors.

The Table in FIG. 3 has six broad descriptor 16 categories of Action, Adventure, Mystery, Thriller, Drama, and Comedy (column headings), which could be considered "narrative elements." Each row in the Table in FIG. 3 is labeled with different and/or more specific descriptors 17 that can be considered "genres." A media library composed of, for example, movies can use descriptors that pertain to the narrative elements, such as Drama, Comedy, Action, Adventure, Thriller and Mystery. Other descriptors can be more specific, for example, pertaining to the genre, such as crime, science fiction, fantasy, romance, musical, history, documentary, western, and other movie genres known in the art. In one embodiment, an item is tagged with at least two descriptors. In a further embodiment, at least one of the descriptors 14 is broad descriptor, such as, for example, a narrative element 16. In a still further embodiment, each item is tagged with at least one broad descriptor narrative element 16 and at least one genre 17. FIG. 2 illustrates one example of a media library 10 with items 12 tagged with one or more descriptors 14 that are at least one narrative element. Complex descriptors 18 that comprise more than one data can also be used to tag items. For example a complex descriptor can be two or more broad descriptors used together, such as Action-Adventure or two specific descriptors, like Horror-Mystery. It can also include any other information about the item. The descriptors utilized can depend upon the type of items in a media library. It is within the skill of a person trained in the art to determine the descriptors most applicable to the items in a media library. Variations in descriptors that provide the same functionality, in substantially the way as described herein, with substantially the same desired results, are within the scope of this invention.

II. Strength of Association Ratios

Figures 4A, 4B:
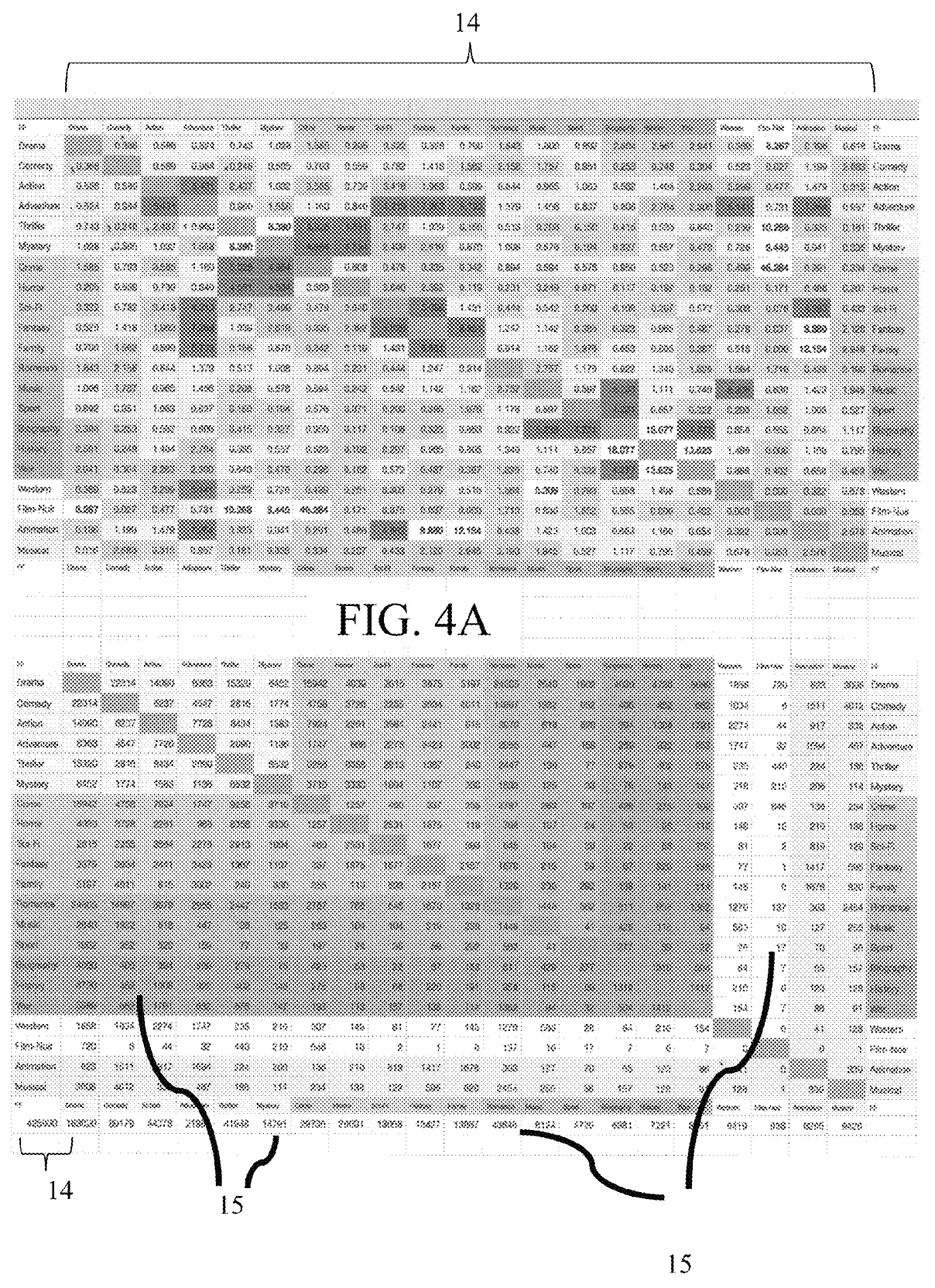

The descriptors 14 tagged to each item 12 can be counted or "tallied" to obtain a number of items associated with each descriptor. In one embodiment, each descriptor associated with an item is tallied. For example, a movie tagged with Drama and Science Fiction descriptors can be tallied under both descriptors. A movie tagged with, for another example, Adventure, Comedy, and Romance descriptors can be tallied under all three descriptors. Tallying all of the items associated with a descriptor can provide total counts 15 that correspond to the number of items tagged with each descriptor, as well as total counts of the number items associated with any two descriptors. Tallies can be utilized to determine associations between any two descriptors. FIG. 4B is a table showing, in the bottom row, an example of total counts 15 for descriptors 14 used for a representative media library comprising 425,930 movies. Within each cell of the table the total number of movies tagged with two of the descriptors is shown. It can be seen in the table in FIG. 4B, for example, that there are 44,378 movies tagged with the Action descriptor and 7,924 movies tagged with both the Action and Crime descriptors.

In a further embodiment, a Strength of Association Ratio (SAR) 20 equation is used to quantify the relationship between any two descriptors 14 in the media library 10. The SAR represents the association between any two descriptors with regard to all of the items in a media library. In other words, the SAR can represent the magnitude of the relationship between two descriptors in the media library. The SAR obtained for any two descriptors can further indicate the likelihood of one of the descriptors being associated with the other descriptor in the media library, which indicates the likelihood of an item in the media library tagged with those two descriptors.

Figure 22:
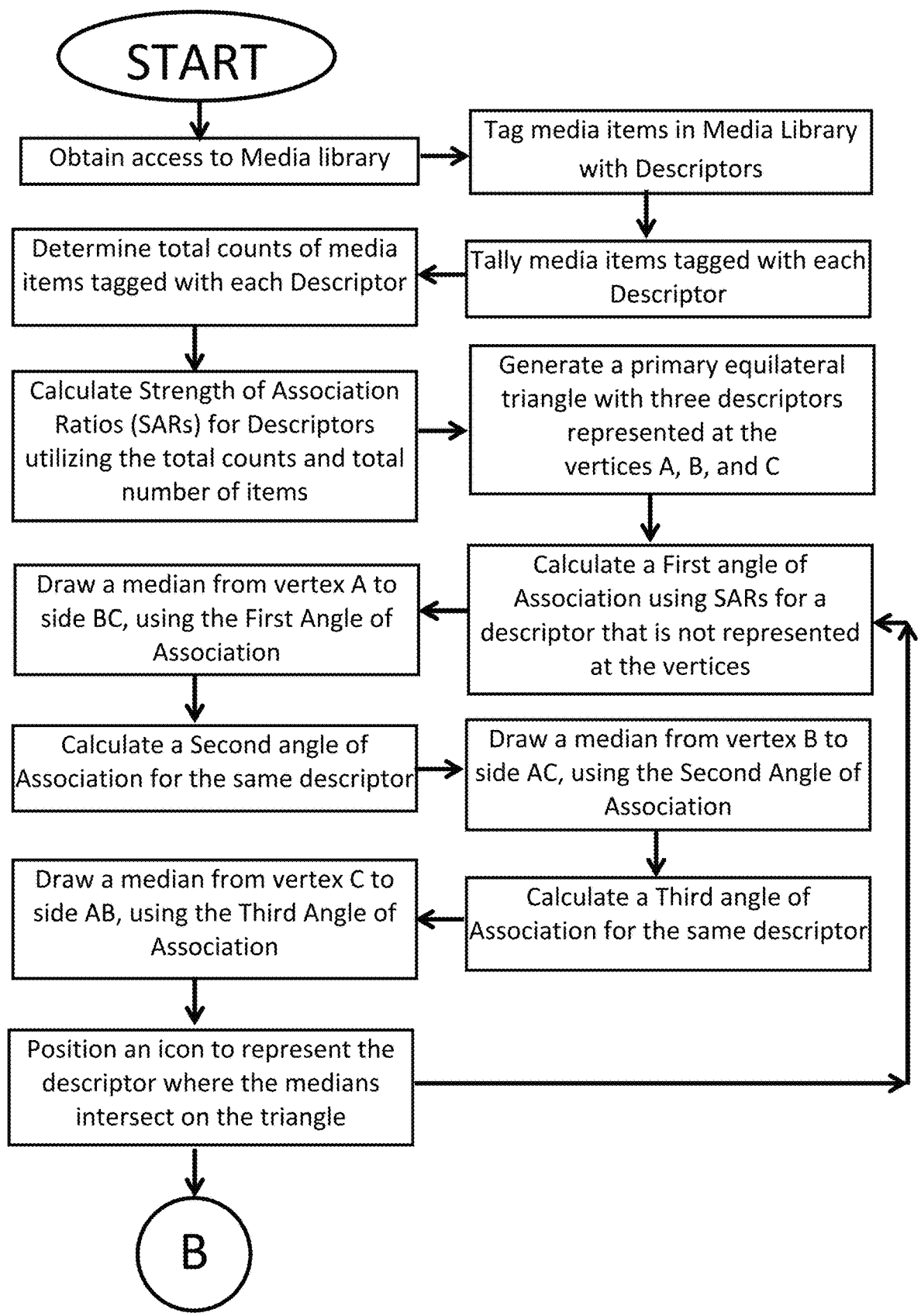
FIG. 22 is a flowchart the demonstrates one embodiment, according to the subject invention, of a method for creating a pictograph and positioning icons thereon utilizing the Strengths of Association Ratios and Angles of Association a Triangulation Method.
Figure 23:
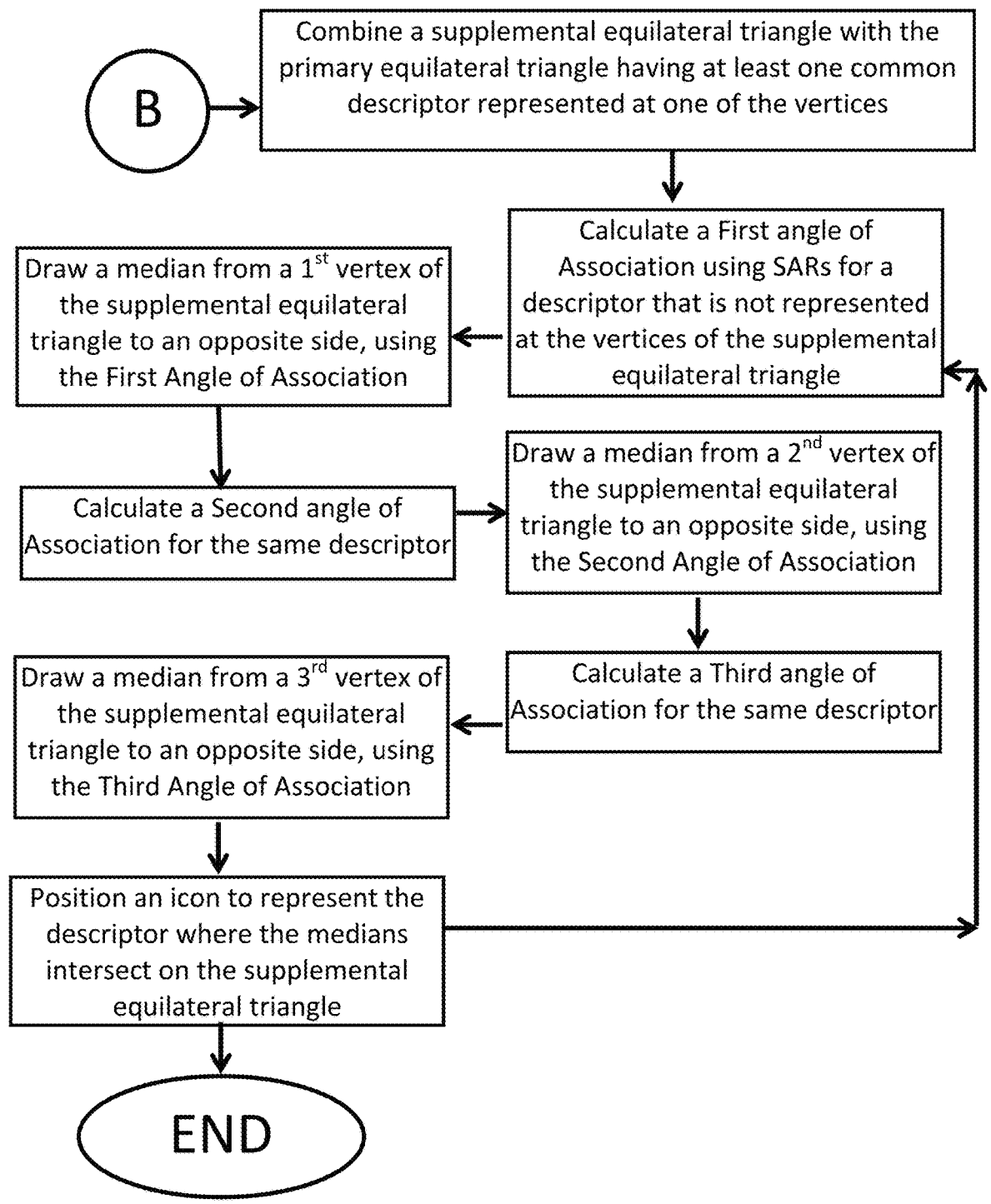
FIG. 23 is a flowchart that demonstrates one embodiment, according to the subject invention, of a method for creating an expanded 2-dimensional pictograph by adding supplemental equilateral triangles and positioning icons on the supplemental equilateral triangles.

The SAR 20 is based on the number of items tagged with any two descriptors 14, so any media library can have different SARs than another media library for the same pair of descriptors. For example, a first media library can have more items tagged with Comedy and Adventure descriptors than a second media library. Thus, the SAR calculated for those descriptors would be higher for the first media library than the second media library, which indicates it is more likely that items tagged with one descriptor are also tagged with the other descriptor in the first media library. In another example, a media library can have items tagged with Action and Crime and fewer items tagged with Action and Sci-fi. The SAR for the Action and Crime descriptors combination will be greater than the SAR for the Action Sci-fi descriptors combination, indicating that there are items with both tags, but a greater association in the media library between Action and Crime than Action and Sci-fi. This may not, necessarily, indicate that there are only few items tagged with Sci-Fi. In a further example, there could be a great many items tagged with Sci-Fi and Fantasy descriptors which could result in a larger SAR than that for the Action and Crime descriptors. As will be discussed below and shown in FIGS. 22 and 23 this complexity of association between descriptors can be shown in a pictograph.

A SAR 20 can be calculated as follows:

$$\text{Strength of Association Ratio} = (CD - AC - BC + C^2)/(AB - AC - BC + C^2) \quad \text{(Equation 1)}$$

wherein,
A=number of items tagged with descriptor 1 in the media library,
B=number of items tagged with descriptor 2 in the media library,
C=number of items tagged with both descriptor 1 and descriptor 2 in the media library,
D=total number of items in the media library.

For any two descriptors, a SAR 20 of 1.0 indicates a neutral or random association between the two descriptors 14. In other words, the association between the two descriptors is no greater and no less than the association between any other two descriptors, with regard to the items in the media library. This could also be interpreted as a random association between the descriptors. A SAR>1.0 indicates a greater than random association between items tagged with the two descriptors and the larger the SAR the stronger the association between the descriptors. Conversely, a SAR of <1.0 indicates a less than random association between items tagged with the two descriptors and the smaller the SAR the weaker the association.

By way of a non-limiting example, in first media library composed of animation movies, a SAR can be calculated for a descriptor 1, such as comedy, and a descriptor 2, such as romance, as follows:
A—number of items designated with descriptor 1 (comedy), e.g., 1,513,
B—number of items designated with descriptor 2 (romance), e.g., 304,
C—number of items designated with both descriptors (comedy and romance), e.g., 126,
D—total number of items in the media library, e.g., 6,300.

Inserting these example total counts into the Strength of Association equation returns a SAR 20 of approximately 2.352. This SAR indicates that in the media library 10 there is an association between the comedy and romance descriptors 14 with regard to items in the media library.

By way of another non-limiting example, in a second media library composed of feature films, the Strength of Association equation can be used to calculate a SAR for those items designated with the same descriptors 1 (comedy) and 2 (romance), with the following different totals:
A—number of items tagged with descriptor 1 (comedy), e.g., 89,170,
B—number of items tagged with descriptor 2 (romance), e.g., 43,846,
C—number of items tagged with both descriptors (comedy and romance), e.g., 14,997 D—total number of items in the media library, e.g., 425,930.

The totals from the second media library inserted into the Strength of Association equation returns a SAR of approximately 2.158. This SAR indicates that in the second media library 10 there is a weaker association between descriptor 1 (comedy) and descriptor 2 (romance). Thus, in this scenario, there are fewer items in this media library designated with both descriptor 1 and descriptor 2. It is possible to calculate a SAR when there are items that are tagged with at least one descriptor. In that event, the descriptor that is not utilized is given a value of zero in the equation.

Examples of SARs 20 calculated for items designated with descriptors 14 that represent narrative elements 16 (columns) and genres 17 (rows) is shown in FIG. 3. The SARs in white cells are <1, indicating those descriptors with weaker or less than random associations in the media library. The SARs in yellow cells are 1.00 to 1.99, indicating descriptors that are more strongly associated in the media library. The SARs in blue are >2, indicating descriptors with the strongest associations in the media library. Thus, it can be seen in the example in FIG. 3 that, in this particular media library, there is little association between the Horror descriptor and the Drama descriptor, which can also indicate there are relatively very few items 12 in the media library 10 tagged with both descriptors. Conversely, the SAR calculated for the Action and the Superhero descriptors in this media library indicates a stronger association and that proportionally more items are associated with this combination of descriptors.

III. Pictographs

The Tables in FIGS. 3 and 4A convey information about the composition of two media libraries 10. It can be seen from these tables that there can be complex inter-relationships between descriptors used in each library that may not be fully understood by looking at the raw numbers for specific combinations. Advantageously, the embodiments of the subject invention provide a method for presenting SARs, such as those in FIGS. 3 and 4A, in a pictograph 100 that graphically illustrates the associations or relatedness between subsets of the descriptors, with regard to the items in a media library.

Figure 11:
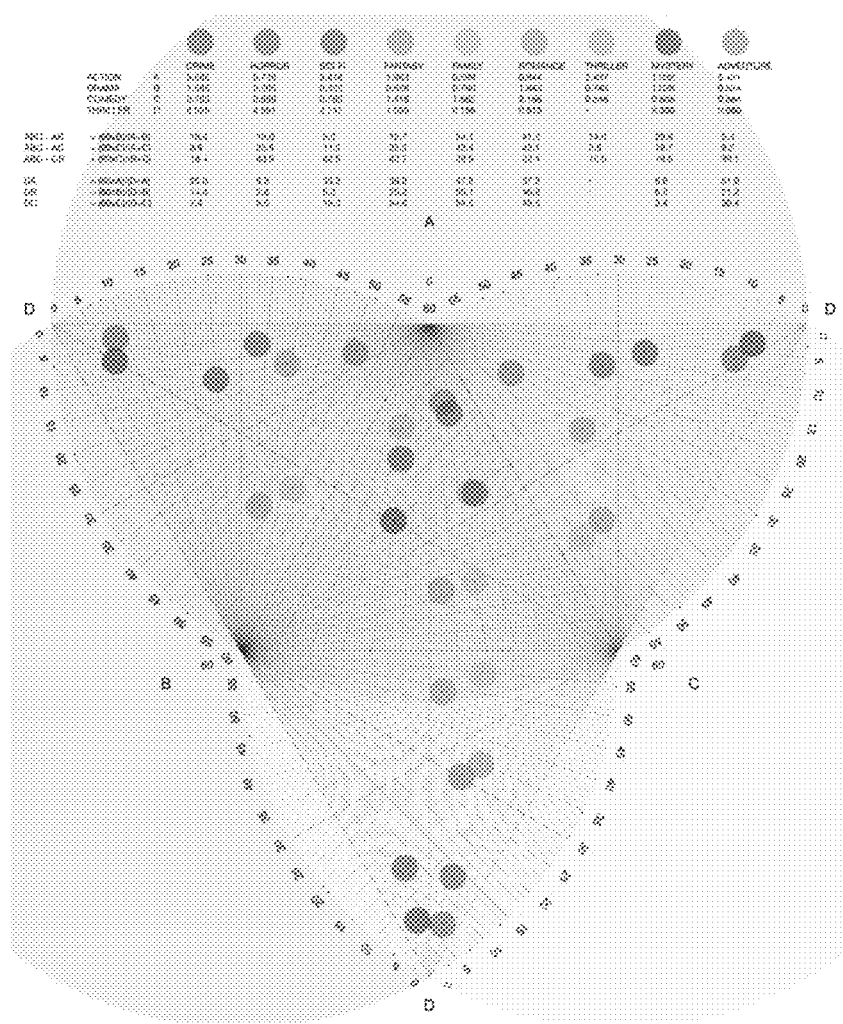
FIG. 11 shown on embodiment of a pictograph that utilizes a combination of triangles, circles, and semi-circles on which icons are positioned.

To better illustrate the relationships that may exist between specific descriptors 14 used for a media library 10, a pictograph 100 can be derived based on the SARs. A pictograph can be a 2-dimensional or 3-dimensional physical or electronic construct that graphically represents the composition of a media library using a subset of the descriptors 14 tagged to items 12. In one embodiment, icons 105 are used to represent the descriptors on a pictograph. An icon can be any symbol that represents a descriptor, including, but not limited to shapes, alphanumeric text, or combinations thereof. In another embodiment, a pictograph has an outline or frame 113 that facilitates the positioning of icons in mathematical or geometric association, which can include, but is not limited to, circles, semi-circles, squares, rectangles, ellipticals, other polygonal shapes, and combinations thereof. FIG. 11 illustrates one example of a pictograph that utilizes a combination of triangles, circles, and semi-circles. Thus, a pictograph can assume a frame of any shape capable of representing a media library and on which icons 105 can be positioned in mathematical relation to one another. This can create a pictograph where one set or subset of descriptor icons can be positioned in proximity to each of another set or subset of descriptor icons represented on the pictograph. FIG. 1 illustrates an example of a 2-dimensional pictograph in which icons 105 (circles), representing one set of descriptors, are positioned in relation to another set of descriptors (triangles), so those that are closely related are in closer proximity to one another or in the same general area on the pictograph. The squares at each corner, in this example, represent broad classes of items and the icons in or near that corner icon are more closely related to that icon and to each other than to icons in other corners. In one embodiment, the icons are positioned in relation to one another based on the SARs calculated for the media library.

An accurate representation of the composition of a media library as a pictograph 100 can depend on the frame of the pictograph and the accuracy with which the icons 105 can be positioned on the pictograph. In one embodiment, a pictograph is any 2-dimensional or 3-dimensional polygonal frame on which icons can be positioned in mathematical relation to one another, relative to the shape of the frame of the pictograph. Specifically, a pictograph can be a 2-dimensional frame on which a set or subset of descriptor icons can be positioned relative to another set or subset of descriptor icons based on the SARs calculated for those descriptors.

In a further embodiment, complex pictographs can be prepared by manipulation of one or more pictographs. In one embodiment, the one or more pictographs have one or more vertices representing different descriptors. The one or more pictographs can be manipulated in various ways, such as, for example, by joining, rotating and/or intersecting all or part of the one or more pictographs or by using other geometric techniques to create a complex 2- or 3-dimensional pictograph. In a still further embodiment, the frame of a 2-dimensional pictograph can be manipulated to form a 3-dimensional pictograph frame. In a yet further embodiment, one or more 3-dimensional pictographs, each with one or more different descriptors represented at the vertices, can be manipulated and/or combined in any of a variety of arrangements, to form complex 3-dimensional pictographs 150. In a specific embodiment, one or more manipulations of a 2-dimensional pictograph can be conducted to duplicate subsets or combinations of descriptors on a pictograph.

IV. Triangulation Method

In one embodiment, a pictograph 100 is a triangle 114. In a further embodiment, a pictograph is a triangle comprising at least one 60° angle. In a particular embodiment, a pictograph has a primary equilateral triangle 115, such as shown, for example, in FIG. 5. In a further embodiment, icons 105 representing a set or subset of descriptors can be positioned on the triangle in relation to the icons located at the vertices. In a specific embodiment, icons 105 representing one or more genres 17 are positioned on a pictograph 100 in relation to the narrative elements 16 represented by at each of the vertices 120. Advantageously, a pictograph based on a triangle can allow the positioning of descriptor icons, e.g., genre 17 icons, on the pictograph relative to a subset of descriptor icons, e.g., narrative element 16 icons, using a Triangulation Method. It can also be more advantageous to use an equilateral triangle for the precise positioning of icons 105 using a Triangulation Method. With this method, an angle can be calculated from each vertex 120 using the SARs. Icons representing the genre descriptors 17 can be positioned where the angles intersect on the pictograph.

Figure 5:
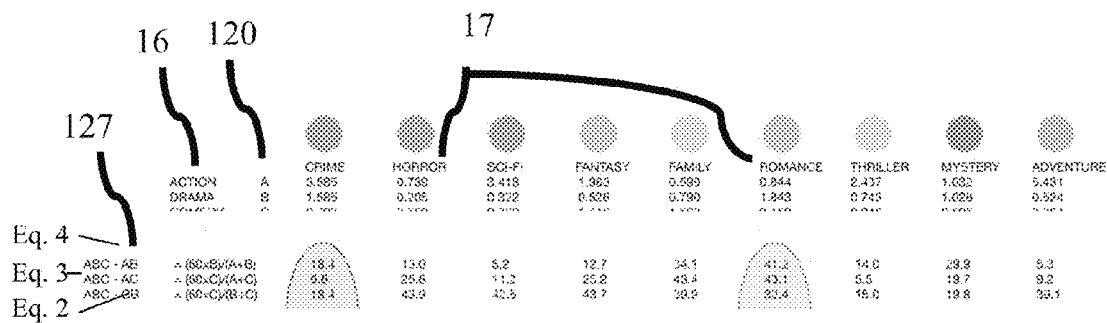
FIG. 5 shows one embodiment of a pictograph, according to the subject invention.
Figure 5:
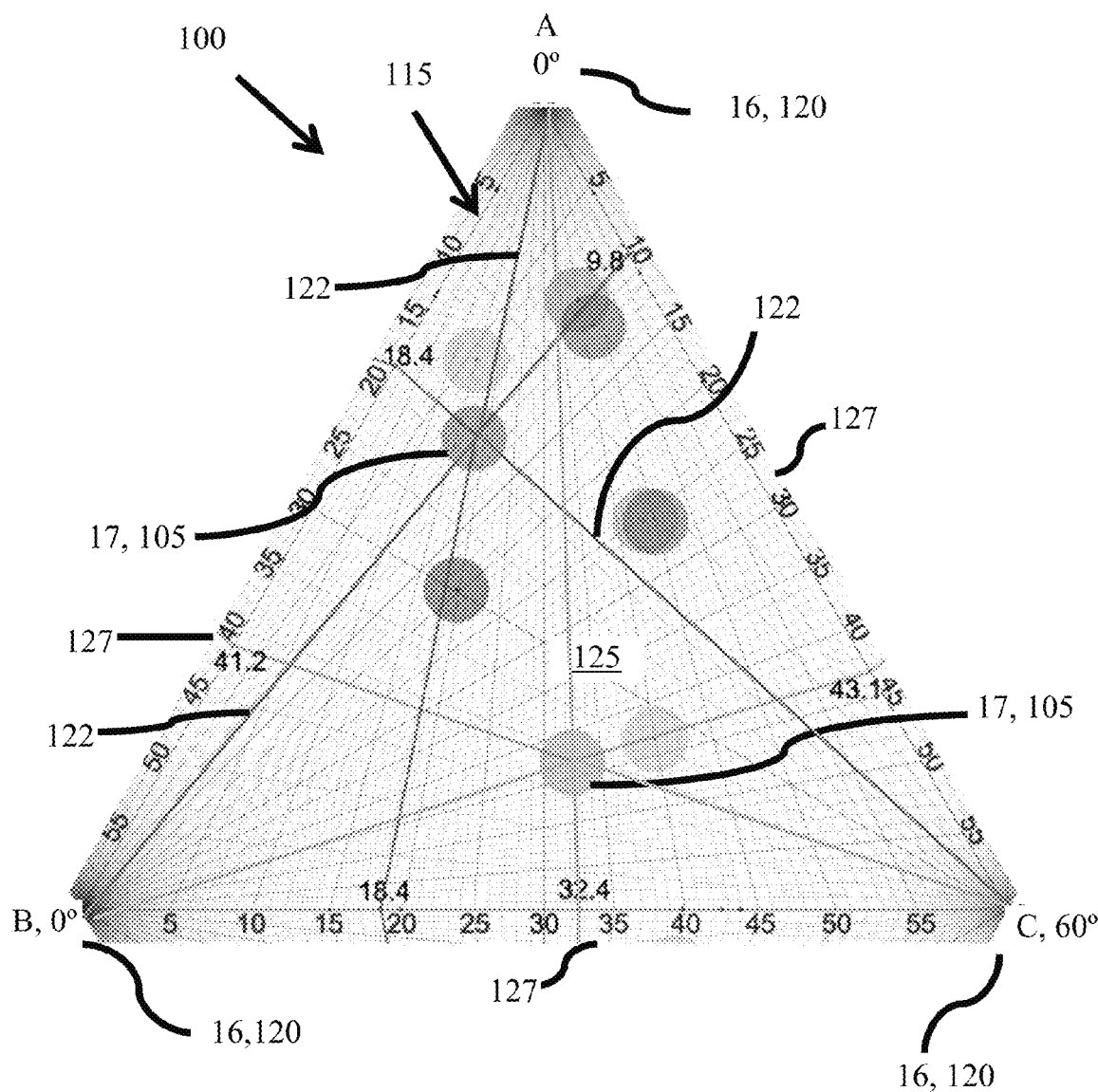

In one embodiment, the Triangulation Method employs at least two of three Angle of Association (AA) equations to calculate an angle between 0° and 60° from a vertex 120 of a primary equilateral triangle 115 for a selected genre. Each angle, $\angle A$, $\angle B$, and $\angle C$, represents a magnitude of association of the selected genre to the narrative elements represented at the two vertices of the opposite side or leg 127 of the triangle. For example, a triangular pictograph can have vertices A, B, and C, which define legs AB, AC, and BC, such as shown in FIG. 5. Using the Angle of Association Equation for vertex A will generate an angle that can be measured on leg BC, using vertex B the Angle of Association will generate an angle that can be measured on leg AC, and using vertex C the Angle of Association will generate an angle that can be measured on leg AB.

The Triangulation method can be utilized to create a 2-dimensional and a 3-dimensional construct. In one embodiment, a 2-dimensional construct, such as a graphic or drawing, is created initially and additional triangles can be extrapolated or extended therefrom and the extended pictograph can be manipulated or modified to achieve a 3-dimensional pictograph. To facilitate the method of extrapolating or extending triangles, the zero point can be arranged where two legs of the triangle form a vertex. For example, the zero point can be at the top-most vertex for the two vertical legs and at the bottom left vertex for the horizontal leg, an example of which is shown in FIG. 5. Thus, when measuring $\angle B$ and $\angle C$, zero would be located at the top of the triangle and when measuring $\angle A$, zero would be located at the bottom left. This can be advantageous when employing geometric transformation methods to create 3-dimensional constructs or complex pictographs, as described below.

Utilizing the Triangulation method, an angle arm 122 can be drawn from each vertex to the opposite leg, an example of which is shown in FIG. 5. Where the angle arms 122 intersect on the interior 125 of the 2-dimensional primary equilateral triangle 115 pictograph 100 provides the position for the respective genre icon. The position of the icon can also indicate its relation to the other narrative element icons and genre icons positioned on the pictograph.

The non-limiting example in FIG. 5 illustrates an equilateral triangle 115 where the vertices, A, B, and C represent three narrative elements 16, Action, Drama, and Comedy, respectively, and icons for genres 17 Crime, Horror, Sci-Fi, Fantasy, Family, Romance, Thriller, Mystery, and Adventure are positioned using the respective SARs shown in FIG. 5 in the three Angle of Association (AA) equations, as follows:

First Angle of Association $(\angle A')=(60\times C)/(B+C)$  (Equation 2),

Second Angle of Association $(\angle B')=(60\times C)/(A+C)$  (Equation 3),

Third Angle of Association $(\angle C')=(60\times B)/(A+B)$  (Equation 4)

wherein,
A=SAR calculated for the selected genre and the narrative element positioned at vertex A,
B=SAR calculated for the selected genre and the narrative element positioned at vertex B,
C=SAR calculated for the selected genre and the narrative element positioned at vertex C.

The resulting value from each equation represents an angle $\angle$ that can be measured from the respective vertex to the opposite leg. In one embodiment, at least two Angles of Association are calculated. As shown in FIG. 5, the First Angle of Association for the genre Crime is 18.4 and is measured on side CB from vertex A; the second Angle of Association for the genre Crime is 9.8 and is measured on side AC from vertex B; and the Third Angle of Association for the genre Crime is, coincidentally, also 18.4 and is measured on side AB from vertex C. A purple circular icon 105 can be seen in FIG. 5 that is accurately positioned to represent the genre Crime on the pictograph 10 where the angle arms intersect. Similarly, the Angles of Association for Romance are $\angle A'=32.4$, $\angle B'=43.1$ and $\angle C'=41.2$. When measured on the opposite leg from the respective vertex, a green circular icon 105 can be seen in FIG. 5 where the angle arms for the Romance genre intersect. While it can be preferable to calculate all three Angles of Association, it is possible to calculate two Angles of Association, such that the respective icon can be positioned where their angle arms cross. Icons for the other genres can be positioned in a similar fashion utilizing the SARs, as shown in the respective Angle of Association equations to obtain angles $\angle$, as shown in FIG. 5. Placing all of the desired genre icons 105 on the primary equilateral triangle 115 results in a 2-dimensional pictograph that represents those genres of that specific media library and their proximity on the pictograph illustrates the relationship between the genres with regard to the items 12 in the media library. Those icons in close proximity are more likely to be associated in the media library. Likewise, the further away icons are from each other, the less likely they are to be associated in the media library.

For the example in FIG. 5, it can be seen that the light purple icon for the Crime genre and the gray icon for Thriller genre are in close proximity on the pictograph and the Thriller icon is closer to the Action vertex icon than the Crime icon, which indicates that items in the media library tagged with the Thriller descriptor is also slightly more likely to be tagged with the Action descriptor than items tagged with the Crime descriptor, but both have more of an association with the Action descriptor than with the Comedy descriptor. Likewise, the icons for the Romance (green) and Family (yellow) are in close proximity to the Comedy descriptor at vertex C, but the Family descriptor has a stronger association than the Romance descriptor. Further, with regard to this example media library, it can be seen that the darker purple genre icon for Mystery is between and closer to the leg 127 with the Action and Drama vertex icons, but at a distance from the Comedy icon on the pictograph. This indicates that items in the media library tagged with the Mystery descriptor are equally likely to be tagged with the Action and Drama descriptors and less likely to be tagged with the other descriptor represented a vertex C on the pictograph. For the sake of comparison, FIG. 1 shows a 2-dimensional pictograph 10 with the same descriptors represented at each vertex and on which are positioned the same icons shown in FIG. 5. It can be seen that for the media library represented on the pictograph in FIG. 1 several icons for the same genres in FIG. 5 are in different positions, such as for example, romance (green icon), horror (pink), family (yellow), and sci-fi (orange) are in different positions on each pictograph. This indicates a different relationship or association between the genres with regard to the items in each media library relative to the vertex descriptors.

There can also be descriptors that pertain to more general or broader categories of items. In one embodiment, a pictograph can include one or more class descriptors 13 to which one or more descriptors 14 can be associated. By way of one example, items in a media library comprising movies could be tagged with the class descriptors that describe a type or style of movie that is broader in scope than a genre or narrative element. Class descriptors, being broader in scope, can represent an area or section on the pictograph having one more descriptors 14. As such, an icon for a class descriptor can be positioned on a pictograph in such a way that multiple descriptors in proximity would be considered associated with that particular class descriptor. FIG. 1 illustrates one example of a pictograph on which the class descriptors 13 for musical, documentary, feature film, and animation movie types are arranged in corners around the pictograph. In the media library represented by the pictograph in FIG. 1, it can be seen that icons for certain narrative elements and genres are in proximity to particular class icons, indicating a level of relatedness. Note, for example, that the icons for Family and Fantasy genres are in proximity to the animation class descriptor in the upper right corner, while the icon for Romance genre is further away, thus, less related to the animation format. History, Biography, and Sports genre icons are close to, thus, more related to the documentary class descriptor.

Figure 6:
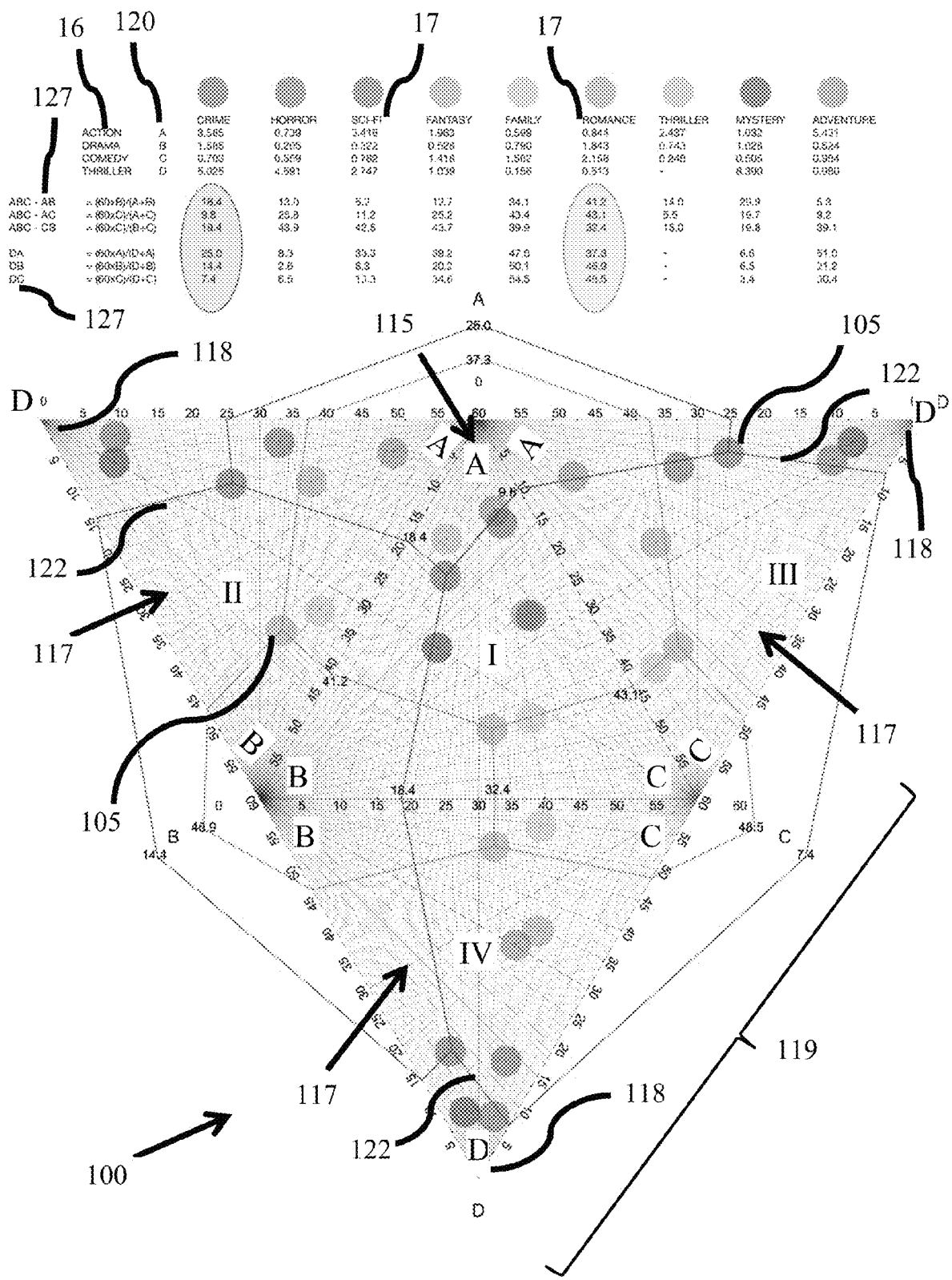
FIG. 6 shows one embodiment of an expanded 2-dimensional pictograph, according to the subject invention.

In one embodiment, a primary equilateral triangle 115, representing three narrative elements 16 at each vertex 120 is the basis for a 2-dimensional pictograph 100 frame 113. In a further embodiment, the primary equilateral triangle can be expanded upon to include additional or supplemental triangles 117, so as to create an expanded pictograph 119 frame. In a still further embodiment, supplemental equilateral triangles 117 are aligned along and extend from one or more sides of the primary equilateral triangular 115 pictograph frame. In a more specific embodiment, supplemental equilateral triangles can be aligned with each side of the primary 115 equilateral triangle to create a 2-dimensional expanded pictograph 119 frame of four connected equilateral triangles with the zero-points on each side in the same relative orientation as the original 2-dimensional equilateral triangular pictograph. An example of an expanded pictograph of equilateral triangles comprising four equilateral triangles, designated as I, II, III, and IV, is shown in FIG. 6 and in FIG. 8 (without icons). As shown, in the examples in FIGS. 6 and 8, the supplemental triangles each share two vertices with the primary equilateral triangle 115. The third or outside vertices 118 of the expanded pictograph of equilateral triangles 119 can represent a different narrative element 16. In the example, shown in FIG. 6, a fourth narrative element, Thriller, is represented as D at the outside vertices.

In a further embodiment, a 2-dimensional expanded pictograph 119 frame can be manipulated by folding, bending, curving, rotating, or rolling along each of the sides of the primary triangle I to create a 3-dimensional tetrahedron pictograph, where the outside vertices are brought together to form a tetrahedron. FIGS. 7A, 7B, 7C, and 7D illustrate a non-limiting example of a 3-dimensional tetrahedron pictograph formed from a 2-dimensional pictograph, such as shown, for example, in FIG. 6, manipulated to bring the vertices for the fourth genre, D, together to form a tetrahedron-shaped pictograph 100.

In one embodiment, the method of positioning icons 105 on a 3-dimensional pictograph utilizes the SARS and the Triangulation Method, discussed above to initially position icons on the primary equilateral triangle I 115, as shown in FIGS. 5 and 6. As explained above and shown in the non-limiting example in FIG. 6, each of four equilateral triangles can have different combinations of vertices: ABC, ACD, ABD, and BCD. Each vertex can represent a narrative element 17 used as a descriptor 14 for items 12 in the media library 10. The table in the example in FIG. 6 lists the four narrative elements represented by the vertices A, B, C, and D, which, in this example, are, respectively, Action, Drama, Comedy, Thriller and nine genres (Crime, Horror, Sci-Fi, Fantasy, Family, Romance, Thriller, Mystery, Adventure). The SARs calculated for each pair is shown under the representative colored icon. Using the SARs, the AAs are calculated using the First, Second, and Third Angles of Association and are shown below the SARs. Using the AA, the Triangulation Method, described above, can be used to position icons for the nine genres on primary triangle I 115, with vertices ABC, representing Action, Drama, and Comedy genres, as shown in the example in FIG. 6.

Figure 8:
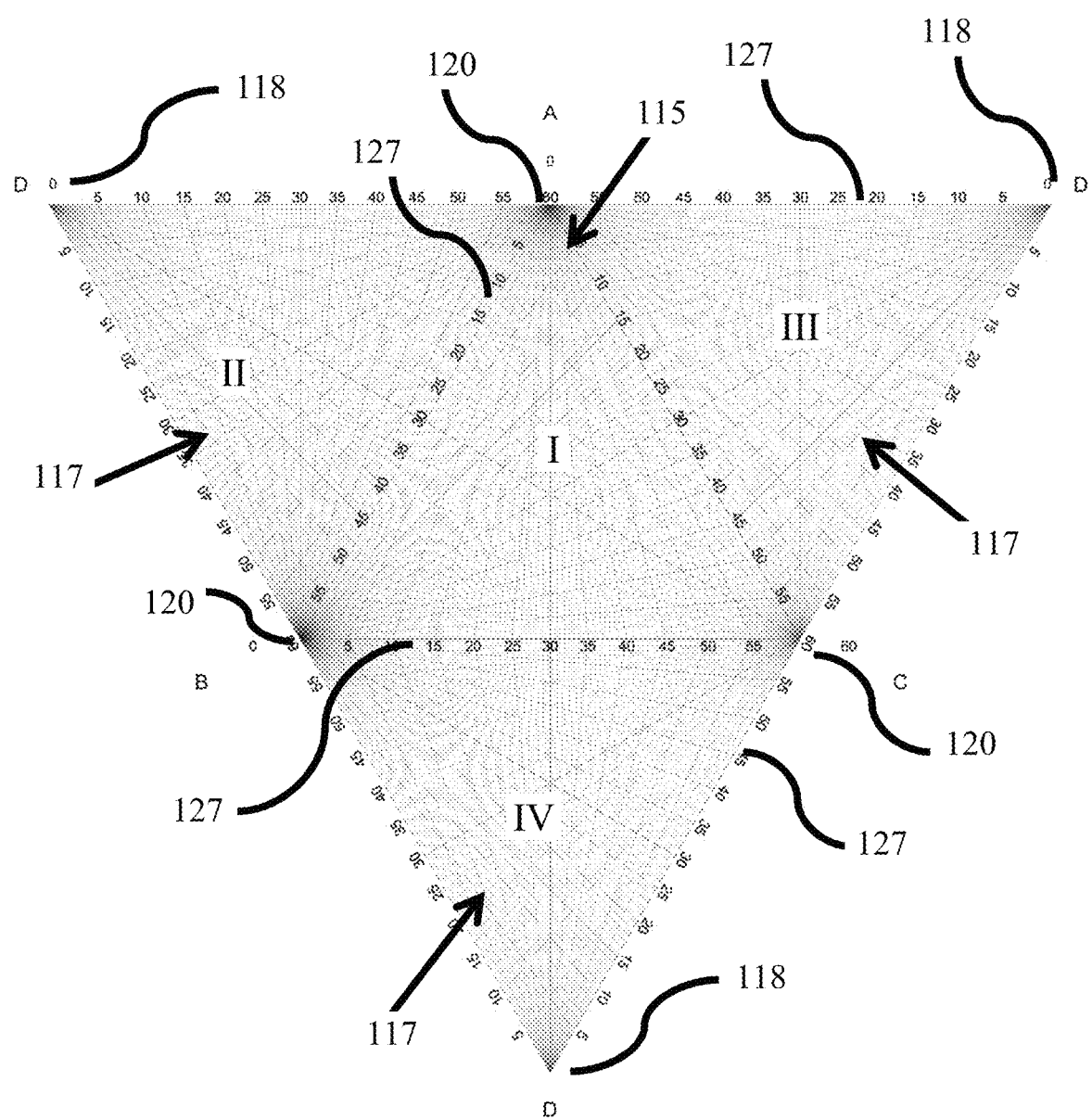
FIG. 8 shows one embodiment of a general outline of an expanded 2-dimensional pictograph, before icons are positioned thereon, according to the subject invention.

Each of the supplemental triangles 117 share a leg 127 with the primary triangle 115. Thus, each supplemental triangle also shares two narrative element vertices 120 with the primary triangle. The fourth narrative element, Thriller, is represented at the vertex of each secondary triangle that is not shared with the primary triangle. In FIGS. 6 and 8 this fourth narrative element is represented by "D" at the three outer corners of the expanded equilateral triangle 119. As will be explained in detail below, the expanded 2-dimensional pictograph frame can be manipulated so that the fourth or outermost vertex becomes the fourth point of a tetrahedron pictograph.

As mentioned above, icons 105 for three of the respective genres can be positioned on the primary equilateral triangle I 115 using the Triangulation Method with each of the three vertices, A, B, and C, (Action, Drama, and Comedy). The further vertex, D (Thriller) can be used to position icons on the supplemental triangles 117. The supplemental triangles can each share one leg 127 and two vertices with the primary triangle, thus, the AA calculated for those vertices can be used to position icons on the supplemental equilateral triangles 117. In one embodiment, additional AAs are calculated using the SAR for the fourth narrative. In the example in FIG. 6, the fourth narrative element, Thriller, is represented at the fourth vertex, D. The table in the example in FIG. 6 includes AAs calculated for each genre using this fourth narrative element, D, providing AAs for each of the legs 127 of the supplemental equilateral triangles 117 that are not shared with the primary triangle, which are DA, DB, and DC.

Icons for the genres can be positioned on the supplemental equilateral triangles 117 utilizing the AA calculated for the fourth narrative element in a modification of the triangulation method. To reiterate, each of the AAs represent an angle measured between two vertices on a leg opposite the respective vertex. So, in the table in FIGS. 5 and 6, the AA designated AB is measured from the opposing vertex C, the AA designated AC is measured from opposing vertex B, and the AA designated CB is measure from opposing vertex A, etc.

In one embodiment, each AA calculated for the primary triangle 115 can be used to measure the same angle in each of the respective supplemental equilateral triangles 117. As discussed above, the AA is measured on the vertex opposite the leg on which the respective vertices are positioned. At least two AA must be calculated to achieve an intersection point. The third AA can further confirm the accuracy of calculations and the positioning of the icon. Thus, using the example in FIG. 6, the AA for leg AB can be measured from vertex D in supplemental equilateral triangle II, the AA for leg AC can be measure from vertex D in supplemental equilateral triangle III, and the AA for leg CB can be measured from vertex D in supplemental equilateral triangle IV. This can provide a first angle in each supplemental equilateral triangle. In a further embodiment, two of the three AAs calculated for the fourth genre, D, in FIG. 6, can be measured in each supplemental equilateral triangle. Thus, the AA for leg DA can be measured from vertices B and C in supplemental equilateral triangles II and III, respectively and the AA for leg DB can be measured from vertices A and C in supplemental equilateral triangles II and IV, respectively. Likewise, the AA for leg DC can be measured from vertices A and B in supplemental equilateral triangle II and IV, respectively. When all AAs for a genre are measured in each supplemental equilateral triangle II, III, and IV, the result can be three intersecting angle arms 122 in each that represents the respective position for the icon 105 representing that genre 16 in each supplemental equilateral triangle 117. It can be seen in FIG. 6 that, on the legs that the primary triangle 115 share with the supplemental equilateral triangles, the angle arms meet at the same point on the respective shared legs of the primary and supplemental equilateral triangles.

V: Complex Pictographs using Combinatorics Manipulations

Pictographs lend themselves to being manipulated in ways that provide further information about the media library they represent. Pictographs having frames based on geometric shapes and expanded pictographs 119 can be particularly advantageous for manipulation. Geometric manipulations can entail creating different spatial arrangements of initially positioned icons so as to create positions for complex descriptors 18 on a pictograph. Geometric manipulations can include, but are not limited to, folding, bending, rotating, curving, twisting, or otherwise changing the configuration of a pictograph. Certain manipulations of a pictograph can provide additional information about the media library that it represents. Other manipulations can further expand the pictograph to include complex descriptors 18 and their representative icons 105.

Figure 7A:
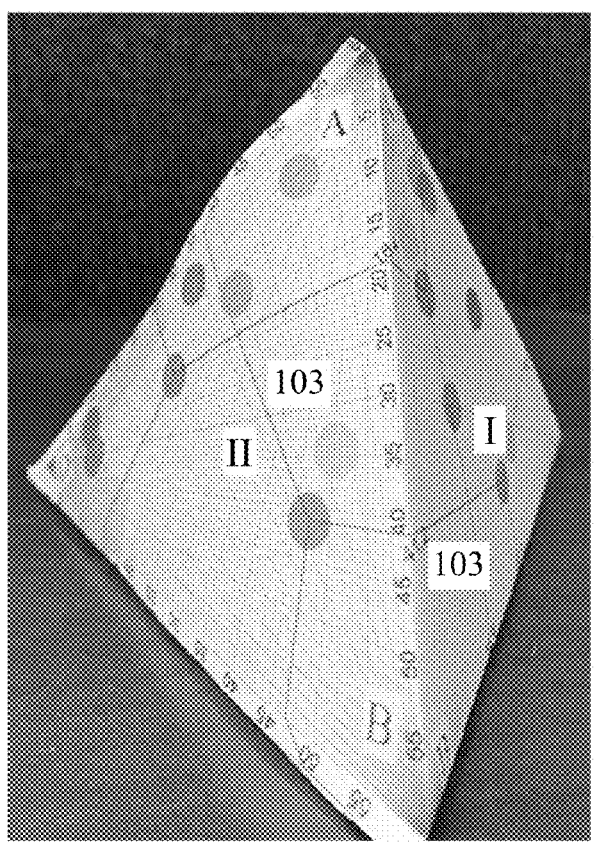
FIGS. 7A, 7B, 7C, and 7D are photographs of different sides of a 3-dimensional pictograph object.
Figure 7B:
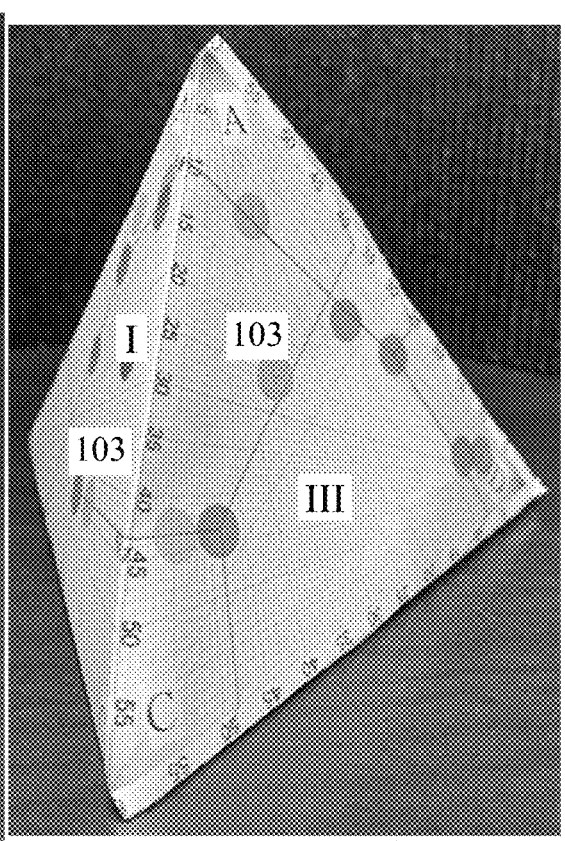
Figure 7C:
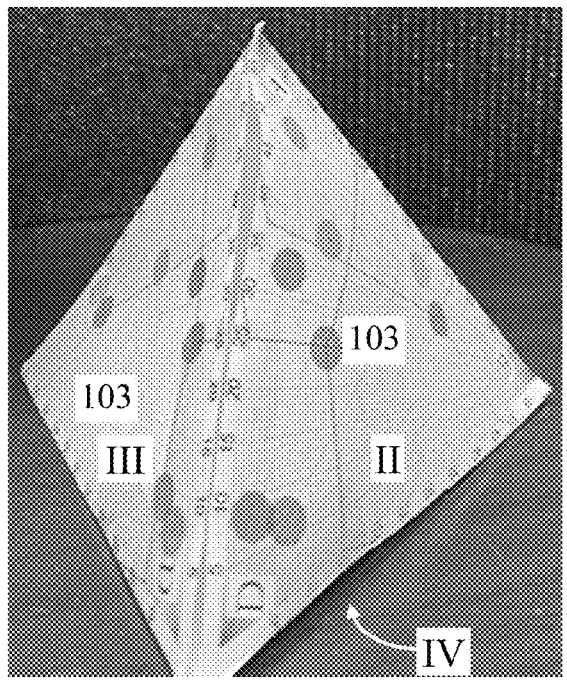
Figure 7D:
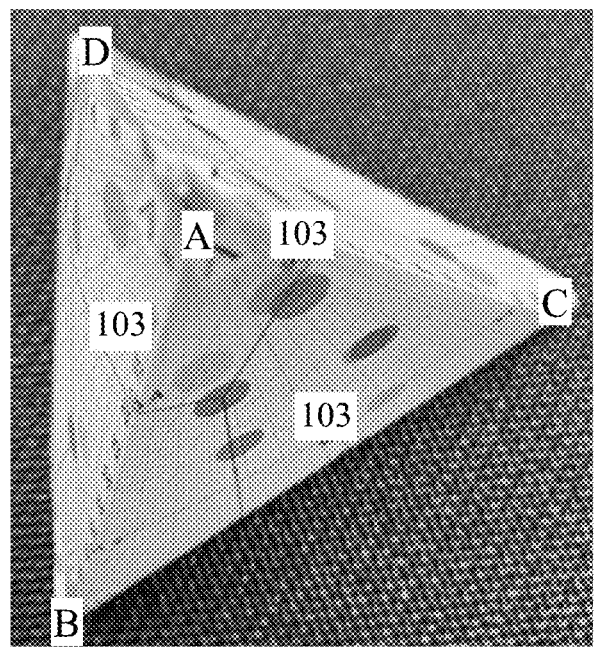

A 2-dimensional pictograph can be manipulated to create a 3-dimensional pictograph. In an embodiment, the pictograph 100 represented by the expanded equilateral triangle 119 is modified or manipulated so that the forth or outside vertex 118 in each of supplemental equilateral triangles II, III, and IV 117 converge to a point so as to create a 3-dimensional tetrahedron or tetrahedron-like pictograph. In this embodiment, each equilateral triangle of the original expanded 2-dimensional pictograph frame becomes a face 103 of the tetrahedron. FIGS. 7A-7D illustrate one non-limiting example of this embodiment where the vertices D, on the pictograph in FIG. 6, converge to a point (FIG. 7C). In this embodiment, the icons on each face 103 of the tetrahedron indicate the associations of the respective genres to the narrative elements 16 represented at the vertices 120 on each face and their associations to each other, with regard to the vertices.

As mentioned above, icons 105 on a pictograph can be assigned colors, shapes, and sizes to convey additional information. In one embodiment, icons are color-coded to indicate narrative elements and/or genres. One example of this is shown in FIG. 1 where the icons are colored and labeled to indicate the specific genre. In another embodiment, icons have shapes that indicate narrative elements and/or genres. FIG. 1 also shows an example of this where the icons for the narrative elements at the vertices are a different shape than the icons for the genres on the triangle. Combinations of shapes and colors can also be used for icons, along with other features. In the example shown in FIG. 1, broad descriptors comprising narrative elements are denoted with triangular icons, specific descriptors 17 comprising genres are denoted with circular icons, and class descriptors 13 comprising formats of the items are denoted with square icons in each corner. In another example, shown in FIG. 14A, the intersection of lines and the associated labels are icons 105.

Figure 9A:
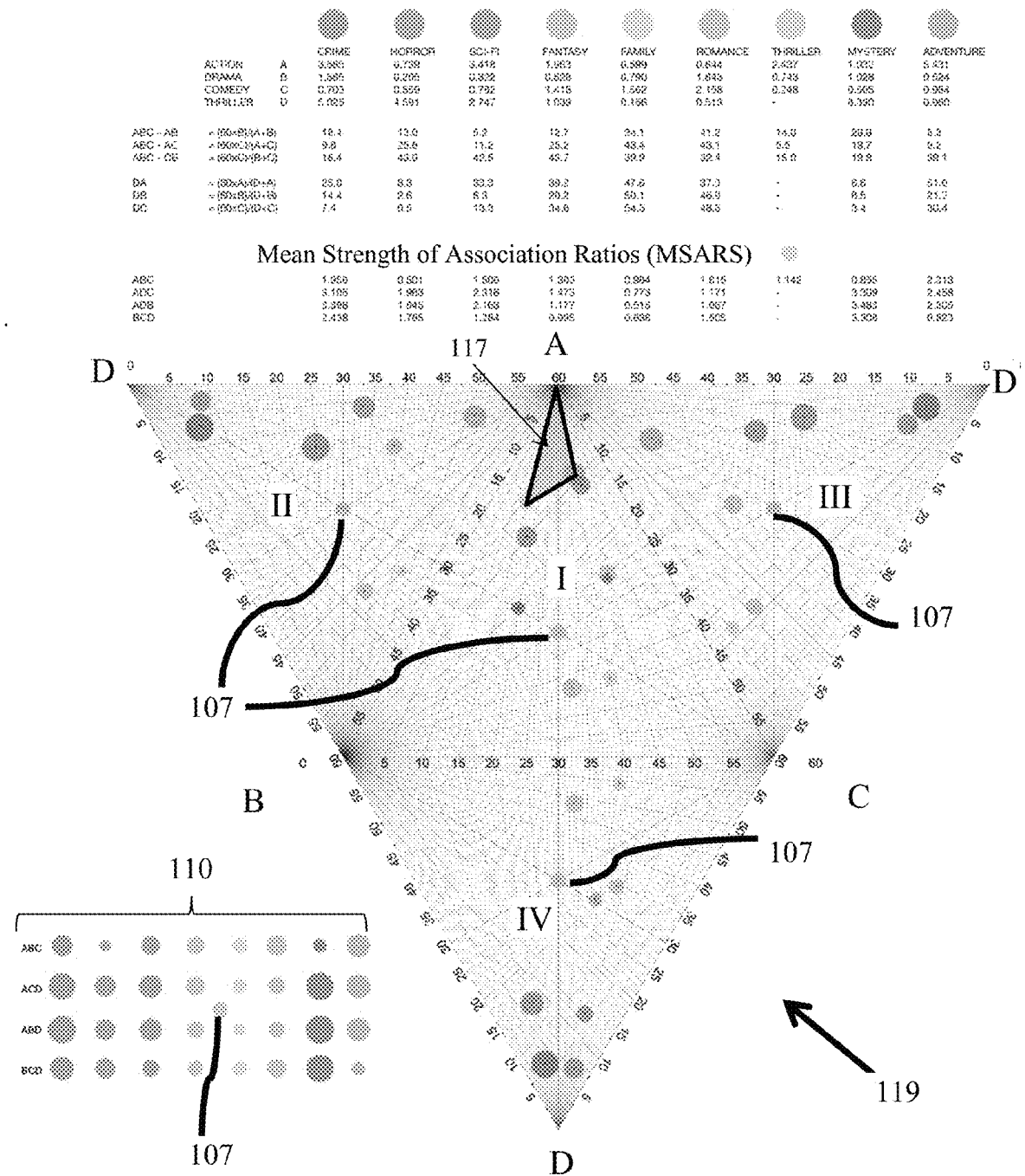
FIG. 9A shows one embodiment of an expanded 2-dimensional pictograph, according to the subject invention, whereon icons are positioned utilizing the data in the tables shown on the Figure.
Figure 9B:
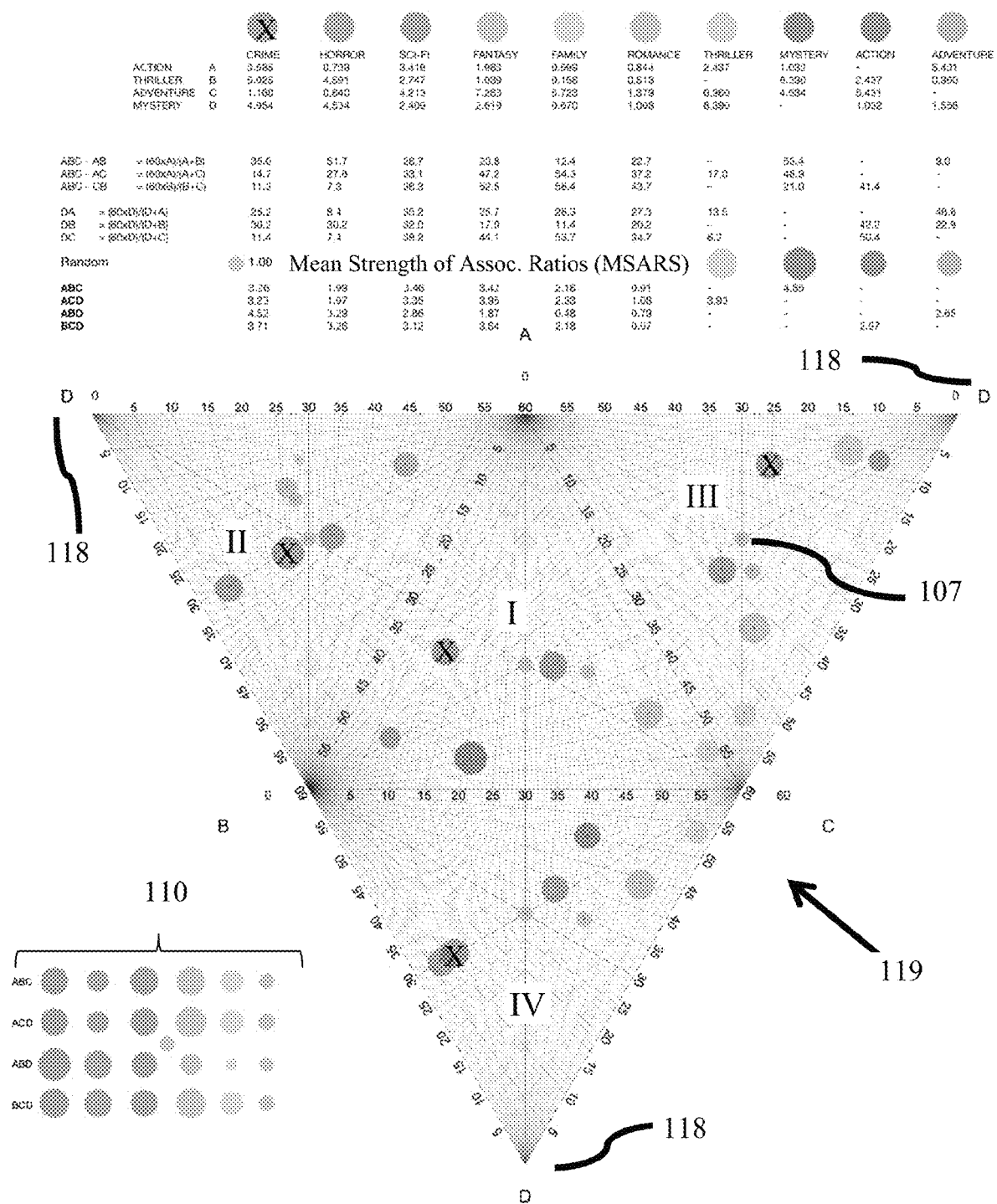
FIG. 9B shows another embodiment of an expanded 2-dimensional pictograph, according to the subject invention, whereon icons are positioned utilizing the data in the tables shown on the Figure. Also shown is a reference icon (center blue dot) and an icon table.

As described above, a 2-dimensional expanded pictograph can be modified or converted into a 3-dimensional pictograph. More specifically, the frame 113 of a 2-dimensional pictograph based on an equilateral triangle can be modified or converted into a 3-dimensional tetrahedron pictograph frame, where each triangle becomes a face on the tetrahedron. In FIGS. 6 and 7A-D, it can be seen that the circular icons for each genre are shown on each face. It can also be seen that icon positions on each face can be different, based on the narrative elements represented on a face. Each icon is also the same size on each face. In one embodiment, the icons for ach genre are sized to more accurately indicate their association with the narrative elements and genres on a particular face. FIGS. 9A and 9B illustrate examples of an expanded pictograph 119 of equilateral triangles on which circular icons for genres are sized according to their association with the narrative elements represented at the vertices of the primary 115 and each supplemental equilateral triangle 117. The SAR and AA data used to position the icons on FIGS. 9A and 9B is presented in the tables on each Figure. Note that a different combination of narrative elements is used for FIGS. 9A and 9B, for comparison. As will be discussed below, different combinations of narrative elements can be used to create more detailed 3-dimensional pictographs of intersecting tetrahedrons. In one embodiment, the icons can also indicate the relatedness of the respective descriptor to the descriptors represented at the vertices. For example, in FIGS. 9A and 9B, the size of the icon indicates the association of that descriptor to the vertices descriptors. With regard to FIGS. 9A and 9B, the smaller the icon the less association with the combination of narrative elements represented at the vertices on that equilateral triangle. FIGS. 10A, 10B, 10C, and 10D show the expanded equilateral triangle in FIG. 9A manipulated into a 3-dimensional tetrahedron with faces 103.

In one embodiment, the size of each icon is relative to the size of other icons on the same face 103, since they are all associated to the same three narrative elements. In one embodiment, the SARs calculated for each genre, with regard to the narrative elements on a face 103, are utilized to determine the size of an icon. In a further embodiment, the SARS are used to calculate an average or a mean SAR (MSAR) for each genre 17 on a given face.

In a further embodiment, a reference icon 107 can be employed to represent a standard against which other icons can be compared. In one embodiment, a reference icon representing a MSAR of 1.0 is provided against which other calculated MSARs are measured. The size and/or shape of a reference icon can depend upon the size and/or shape of the icons. Preferably, the shape of the reference icon is the same or substantially the same as the shape of the icons used on a pictograph to facilitate comparison. It can also be preferable, though not mandatory, for the size of a reference icon to be such that some portion of the icons 105 positioned on the pictograph are larger than the reference icon and some portion of the icons 105 positioned on the pictograph are smaller than the reference icon. In one embodiment, the size of a reference icon is such that approximately one half of the icons positioned on a pictograph are larger than the reference icon and approximately one half of the icons positioned on a pictograph are smaller than the reference icon. Thus, the size of descriptor items in relation to the reference icon can vary depending on the composition of the media library.

It was mentioned above that an SAR of 1.0 calculated for any two descriptors can indicate a neutral or random association between any two descriptors 14. In other words, for an SAR=1 there is as a random association between the two descriptors. With regard to a reference icon 107, a MSAR of 1.0 can indicate the same as an SAR of 1.0. Thus, placement of the reference icon in the geometric center of each triangle, as shown in FIG. 9A, indicates a point on a pictograph where there is an equal or random association to the narrative elements at the vertices.

Looking at the example in FIG. 9A, the Romance descriptor (green) has SARs for the Action, Thriller, and Adventure narrative elements of 0.844, 1.843, and 2.158, respectively. The MSAR for Romance with regard to these narrative elements is 1.616, as shown in the Table in FIG. 9A. For this example, in the primary triangle and supplemental triangle IV, the icon for the Romance genre is slightly larger than the reference circle 107. Using the data in the Table in FIG. 9A it can be seen that the MSAR for the Romance genre is 1.067 in secondary triangle II (ABD). The green icon for Romance in this triangle is almost the same size as the reference icon. The pictographs 100 in FIGS. 9A and 9B show the relative sizes of icons 105 for each of the genres based on the calculated MSARs in the tables.

In another example, on FIG. 9B the icon for Crime (purple with an X) has SARs for the Action, Adventure, and Mystery (A, C, and D) narrative elements of 3.585, 1.160, and 4.954, respectively. The MSAR for Crime with regard to these narrative elements is 3.23, as shown in the Table at the top of FIG. 9B. The reference icon on FIG. 9B represents an MSAR of 1.0. Thus, it can be seen that in triangle III, with vertices A, C, and D, the icon for Crime is significantly larger in size than the reference icon 107.

In a further embodiment, the sizes of icons on each face can be shown in an icon table 110. An icon table can show the sizes of each icon, based on the MSARs relative to the reference icon, as it would appear on each equilateral triangle or tetrahedron face 103. In one embodiment, an icon table includes the vertices on each face and the icons for each genre, sized as they are on each face. FIGS. 9A and 9B illustrate examples of icon tables. In a further embodiment, the icon table can include a reference icon 107 for comparison, such as shown in FIGS. 9A and 9B. It will be appreciated that a SAR cannot be calculated for a single descriptor. Thus, FIGS. 9A and 9B do not indicate a SAR where the narrative element and genre are the same. In those instances, an icon size is based on the average for information available for the other descriptors.

A media library 10 can have items 12 tagged with any of a variety of one or multiple descriptors 14. In the example above, items were tagged utilizing six narrative elements 16 and sixteen genres 17, but more or less could also be used, such that there are subsets or combinations of descriptors. Depending on the shape or configuration of the frame selected for a pictograph 100, all of the narrative elements and genres may be positioned on the selected frame. Alternatively, a subset of narrative elements and/or genres can be positioned on a pictograph. In one embodiment, pictographs portraying a subset of descriptors can be combined with other pictographs to create a larger or more complex pictograph 150 that can include multiple subsets.

Figure 10A:
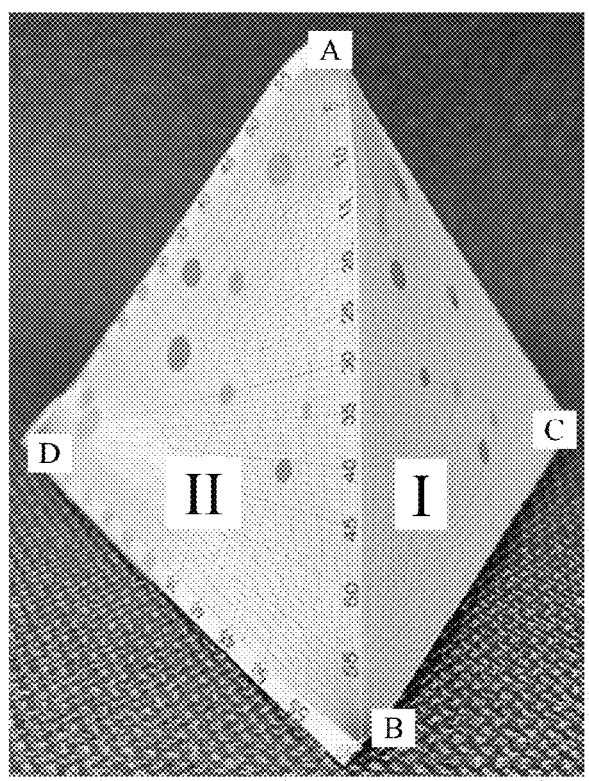
FIGS. 10A, 10B, 10C, and 10D are photographs of different sides of a 3-dimensional pictograph formed from the expanded 2-dimensional pictograph in FIG. 9A.
Figure 10B:
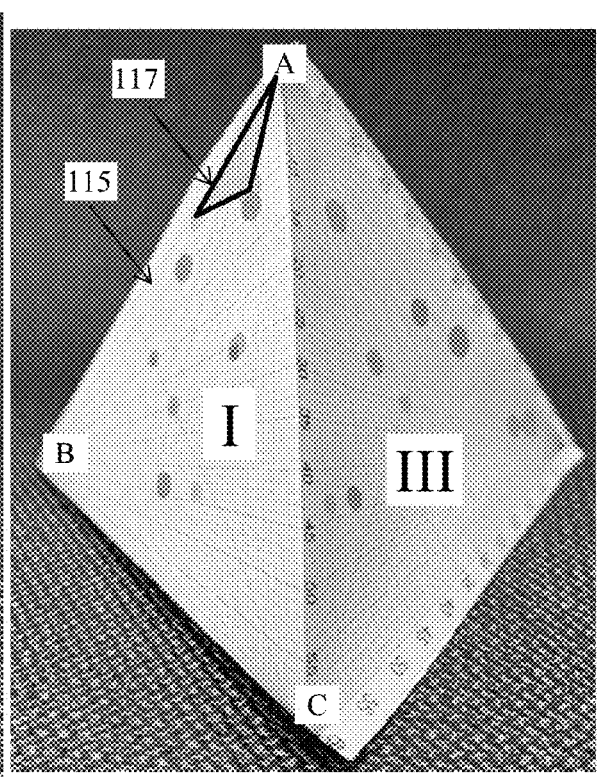
Figure 10C:
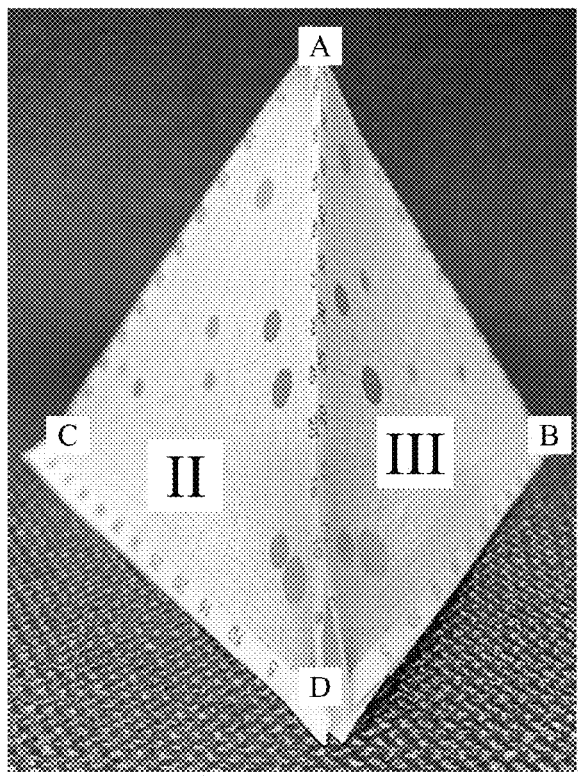
Figure 10D:
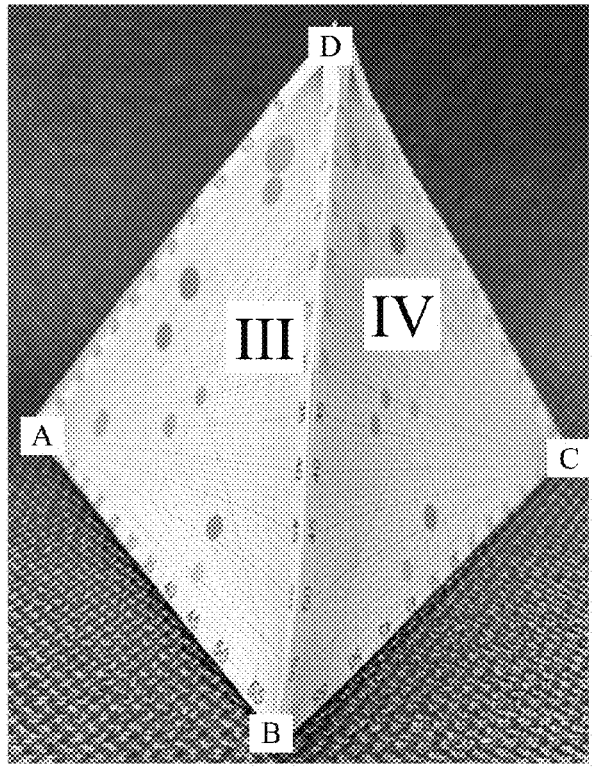

By way of example, the frame of a 2-dimensional triangular pictograph, such as shown in FIG. 5 can be expanded to a more complex pictograph with supplemental triangles 117 that include at least one different genre at one vertex, as shown in FIG. 6. The expanded pictograph in FIG. 6 can be further manipulated to create a more complex 3-dimensional pictograph frame 113, as shown in the example in FIG. 7A-7D. It is also possible to combine pictographs to create complex 2-dimensional pictographs 140 or complex 3-dimensional pictographs 150. Icons can be positioned on the combined 2-dimensional pictographs utilizing calculated SARS and AAs in the Triangulation Method, as described above. In one embodiment, the combined pictographs have the same frame and dimensions. In an alternative embodiment, each of the pictographs to be combined has at least one of a different frame and a different size. For example, an equilateral triangular pictograph frame could be combined with a smaller or larger non-triangular or non-equilateral triangular pictograph frame. In one embodiment, a supplemental triangle 117 is formed within a primary equilateral triangle 115 by utilizing three icons on the primary equilateral triangle as vertices. Icons can be positioned on the supplemental triangle utilizing the vertices. FIGS. 9A and 10B illustrate a non-limiting example of a supplemental triangle within a primary triangle.

Figure 12:
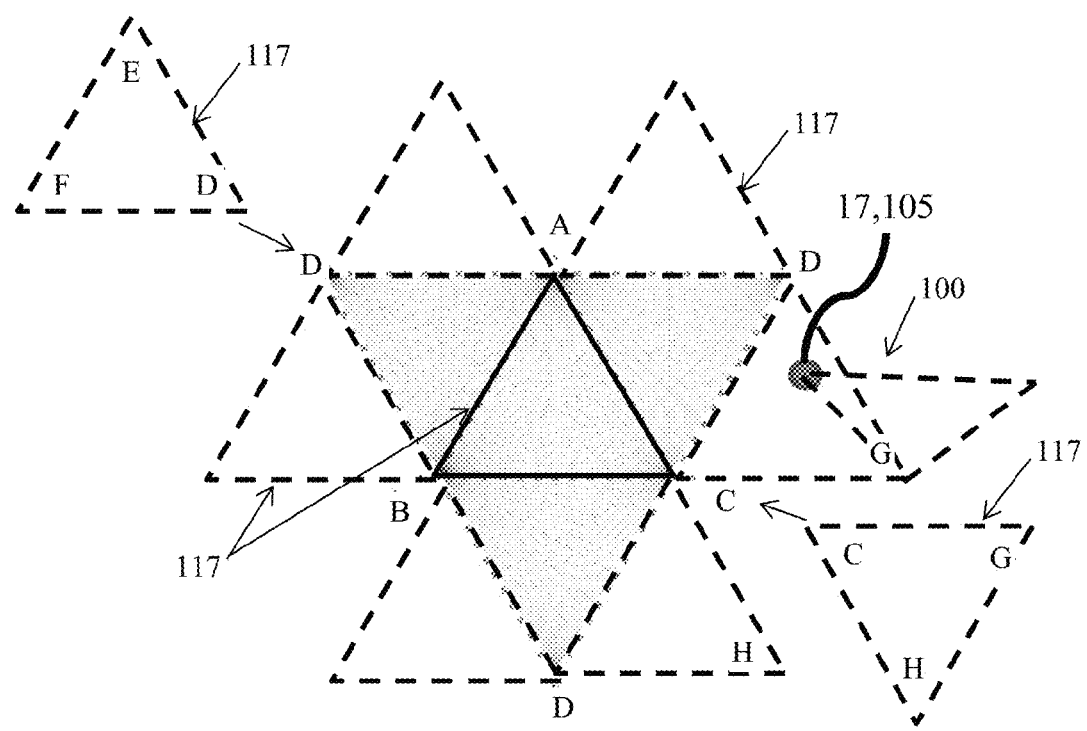
FIG. 12 is an illustration that demonstrates one embodiment of a procedure for creating an expanded 2-dimensional pictograph wherein supplemental triangles share one or more similar vertices.

In one embodiment, two or more pictographs 100 are combined by placing them adjacent to one another to create a complex 2-dimensional pictograph 140. In a further embodiment, pictographs share one or more vertices when placed adjacent to one another. Alternatively, two or more pictographs can be oriented so that their similar vertices are in the same or approximately the same direction on the complex pictograph. For example, the pictographs in FIGS. 6, 8, and 9B can have additional supplemental triangles 117 that have at least one vertex in common with one of the outside vertices 118 and/or a vertex of the primary triangle I 115. FIG. 12 shows an example of a more complex 2-dimensional pictograph 140 on which additional 2-dimensional pictographs are placed adjacent to other pictographs with which they share at least one vertex. The additional pictographs can include different narrative elements at the non-shared vertices, indicated as E, F, G, and H. Also shown in FIG. 12 is a pictograph that shares a vertex with one triangle and an icon 105 positioned in that same triangle, such that the pictographs overlap. There are any of a variety of combinations of 2-dimensional pictographs that can be created utilizing the vertices and icons in each pictograph. Such variations are within the scope of the subject invention.

Figure 13:
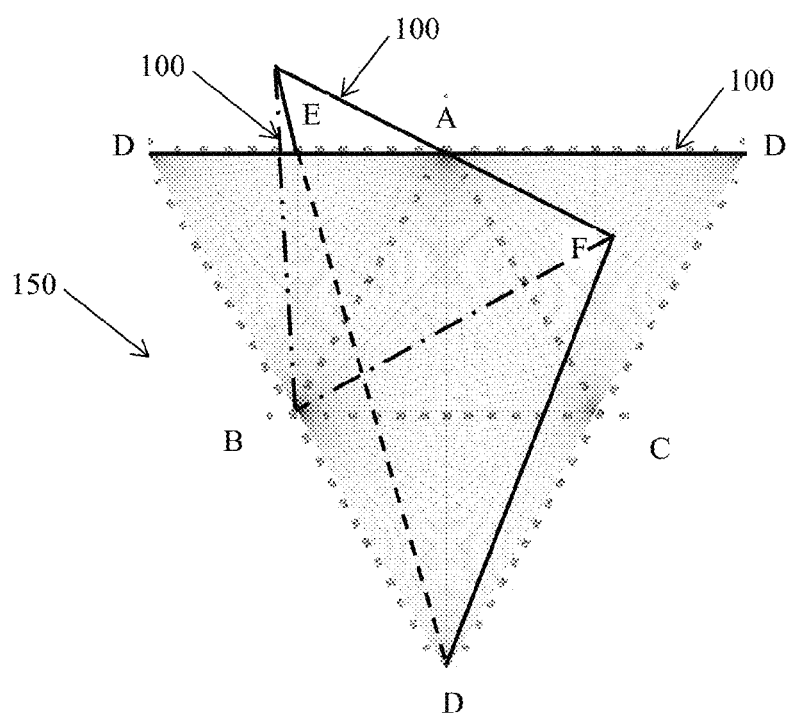
FIG. 13 illustrates one embodiment of an intersecting 2-dimensional pictograph.

In an alternative embodiment, two or more 2-dimensional pictographs can be configured to intersect, creating a complex 3-dimensional pictograph 150. In a further embodiment, two or more 2-dimensional pictographs can be configured to intersect where they have at least one common vertex and/or at least one common genre. One example of intersecting 2-dimensional pictographs is shown in FIG. 13. Icons can be positioned on the supplemental pictographs 117 utilizing calculated SARS and AAs in the Triangulation Method, as described above. Icons can be positioned before the pictographs are intersected. Alternatively, icons can be positioned after the pictographs are intersected. In a particular embodiment, one or more icons are positioned on intersecting 2-dimensional pictographs utilizing vertices from two or more different 2-dimensional pictographs. For example, in FIG. 13 vertices B, E, and F can be utilized to position icons on another 2-dimensional triangle, shown with a dot-dash line, between those vertices. Any of a variety of arrangements of intersecting 2-dimensional pictographs can be used to create complex 3-dimensional pictographs 150. Such variations are within the scope of subject invention. Utilizing the methods described above, it will also be understood that at least one icon 105 can be positioned on any of the intersecting 2-dimensional pictographs.

In another embodiment, two or more 3-dimensional pictographs are combined, to form a complex 3-dimensional pictograph 150. In one embodiment, two or more 3-dimensional pictographs are positioned adjacent to one another. In a further embodiment, two or more 3-dimensional pictographs are placed with faces 103 adjacent to one another at one or more common vertices and/or one or more common icons 105. FIGS. 7A-7D illustrate one example of a 3-dimensional pictograph. FIG. 7A shows a face II of the pictograph that includes vertices A, C, and D. FIGS. 10A-10D show an example of another pictograph also having a face III with vertices A, C, and D. Assuming that the vertices A, C, and D represent the same descriptors 14 on each pictograph, e.g., the same narrative elements, the face II in FIG. 10C could be placed adjacent to the face III in FIG. 7B, with their like vertices aligned, to create a complex 3-dimensional pictograph 150.

Alternatively, two or more 3-dimensional pictographs that share at least one of a vertex and an icon can also be combined to create complex 3-dimensional pictographs. In one embodiment, two or more 3-dimensional pictographs of different size and/or frame can be intersected to create a complex 3-dimensional pictograph. In one embodiment, a first 3-dimensional pictograph can share a vertex and one icon with a second 3-dimensional pictograph, such that the first 3-dimensional pictograph can be adjacent to or overlap the second 3-dimensional pictograph, with the common vertex and the at least one icon aligned. One example of this is shown in FIG. 12.

Items can be described with multiple descriptors 14. The more descriptors utilized to tag an item, the more precise can be the characterization of the item. A complex descriptor 18 is one that includes more than one descriptor. The granularity and precision of a pictograph 100 can be increased by including icons 105 that represent complex descriptors. The Strength of Association and Triangulation methods described above can accurately position individual descriptors on a pictograph, such as the example shown in FIG. 1. Manipulating the pictograph and/or the icons positioned by these methods can create more complex and, in some instances, a more complete pictographic representation of a media library.

Manipulation of icons 105 and/or a pictograph frame 113 can comprise any of a variety of actions in which the spatial arrangement or configuration of all or part of the pictograph frame and/or the icons is changed or enhanced. More specifically, manipulation of all or some portion of a pictograph and/or icons can include one or more geometric transformations, such as, for example, bending, folding, rotating, turning, flipping, reflecting, layering, projecting, resizing, distributing, aligning, duplicating, finding midpoints between icons, or any other manipulation or transformation that leads to an algorithmic distortion to create a different spatial arrangements of the pictograph and/or icons. Manipulation techniques allow for the positioning of a greater number of icons on a pictograph without overcrowding or overlapping.

In one embodiment, the manipulated pictograph and/or icons are positioned in a spatial relationship to the original or initial pictograph and/or icons. In a further embodiment, geometric transformation methods are used to position one or more complex descriptors 18 on a pictograph 100. One example of a complex pictograph obtained by geometric manipulation of an initial pictograph can be seen in FIG. 14. In this example, the initial pictograph is an equilateral triangle on which icons were positioned using the SAR and Triangulation method, described above. A rotation method was utilized in which the initial pictograph frame and the icons thereon were then rotated approximately 60° to the left or to the right. This rotation positioned duplicates of the frame and icons between the vertices of the original pictograph. The duplicate icons were then used to represent complex descriptors that included their original descriptor combined with the descriptors on either side of each duplicate icon. For example, the icon for Action, when rotated, created a duplicate icon representing the complex descriptor Action-Drama. Similarly, the icon for Thriller, when rotated, created a duplicate icon representing the complex descriptor Thriller-Drama, while the icon for Action-Adventure, when duplicated, became an icon representing the Action-Adventure-Comedy complex descriptor, etc.

Figure 17A:
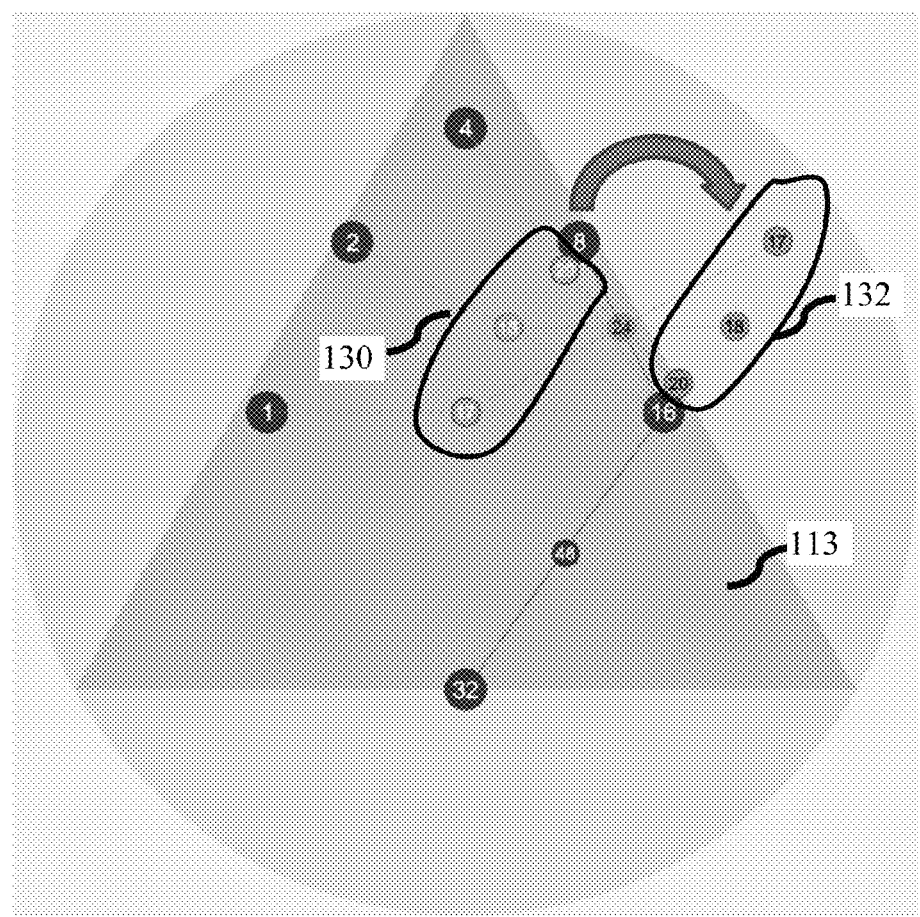
FIGS. 17A and 17B illustrate a particular example of the reflection method of manipulating a subset of icons on a pictograph to position additional icons on the pictograph that represent complex descriptors.
Figure 17B:
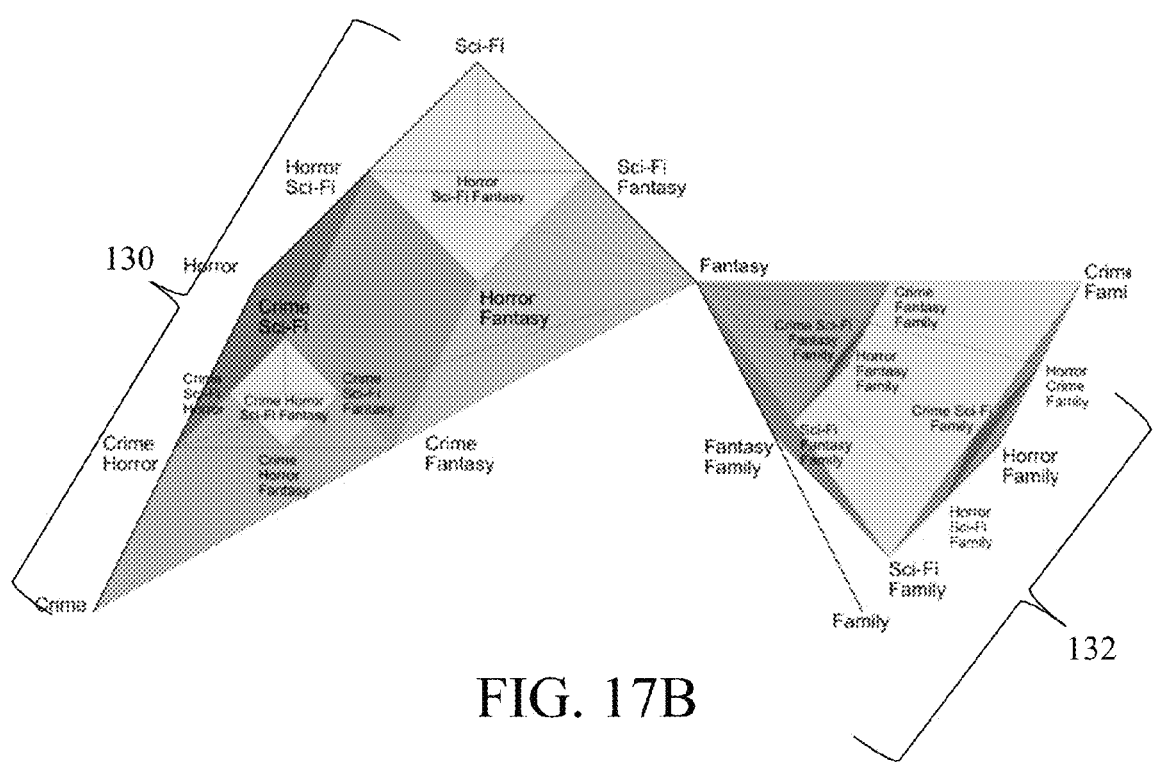
Figure 25:
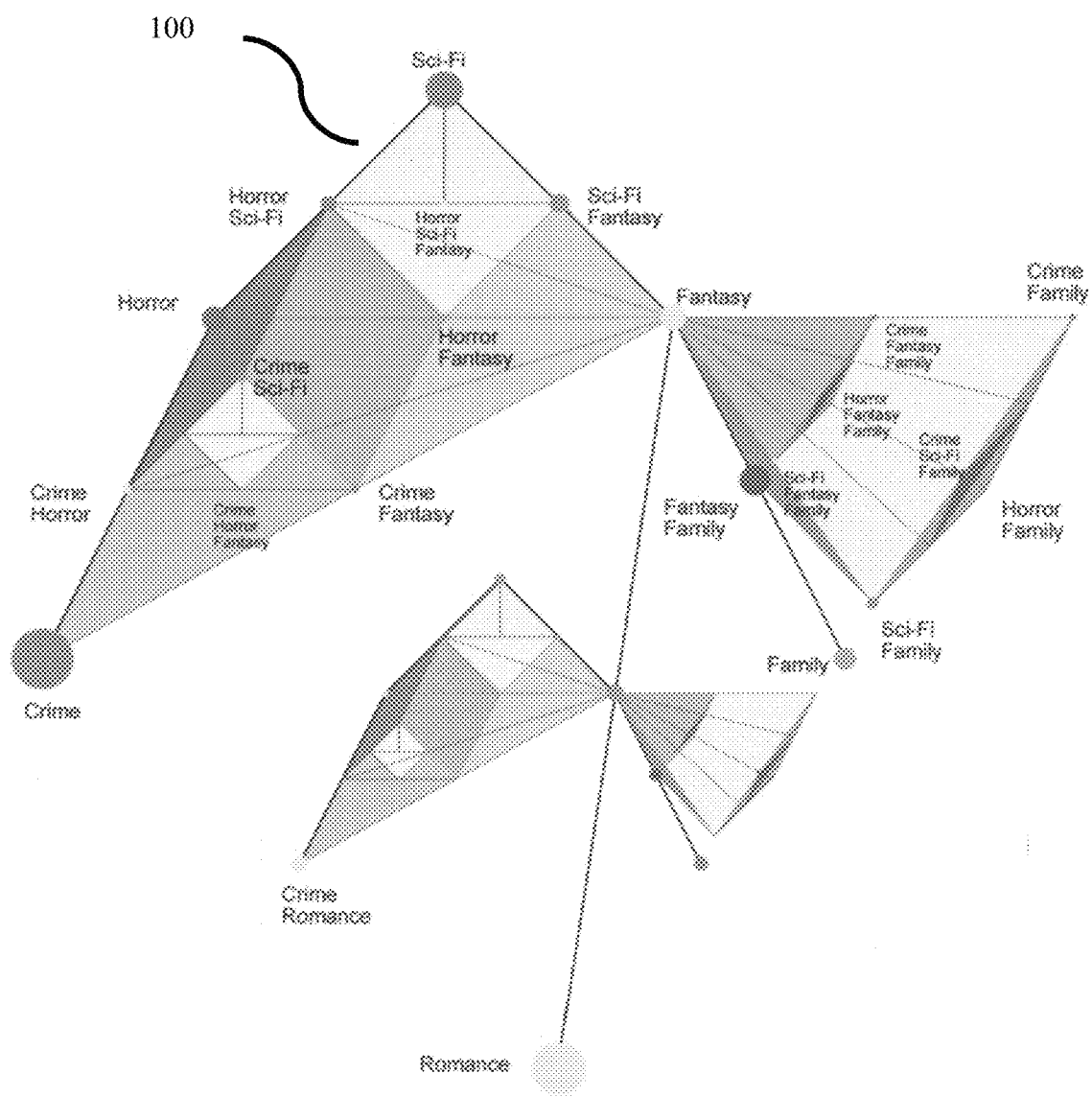
FIG. 25 shows one embodiment of a portion of a pictograph design, according to embodiments of the subject invention, on which the reflection method has been used on multiple subsets of icons to position additional icons representing complex descriptors.
Figure 26:
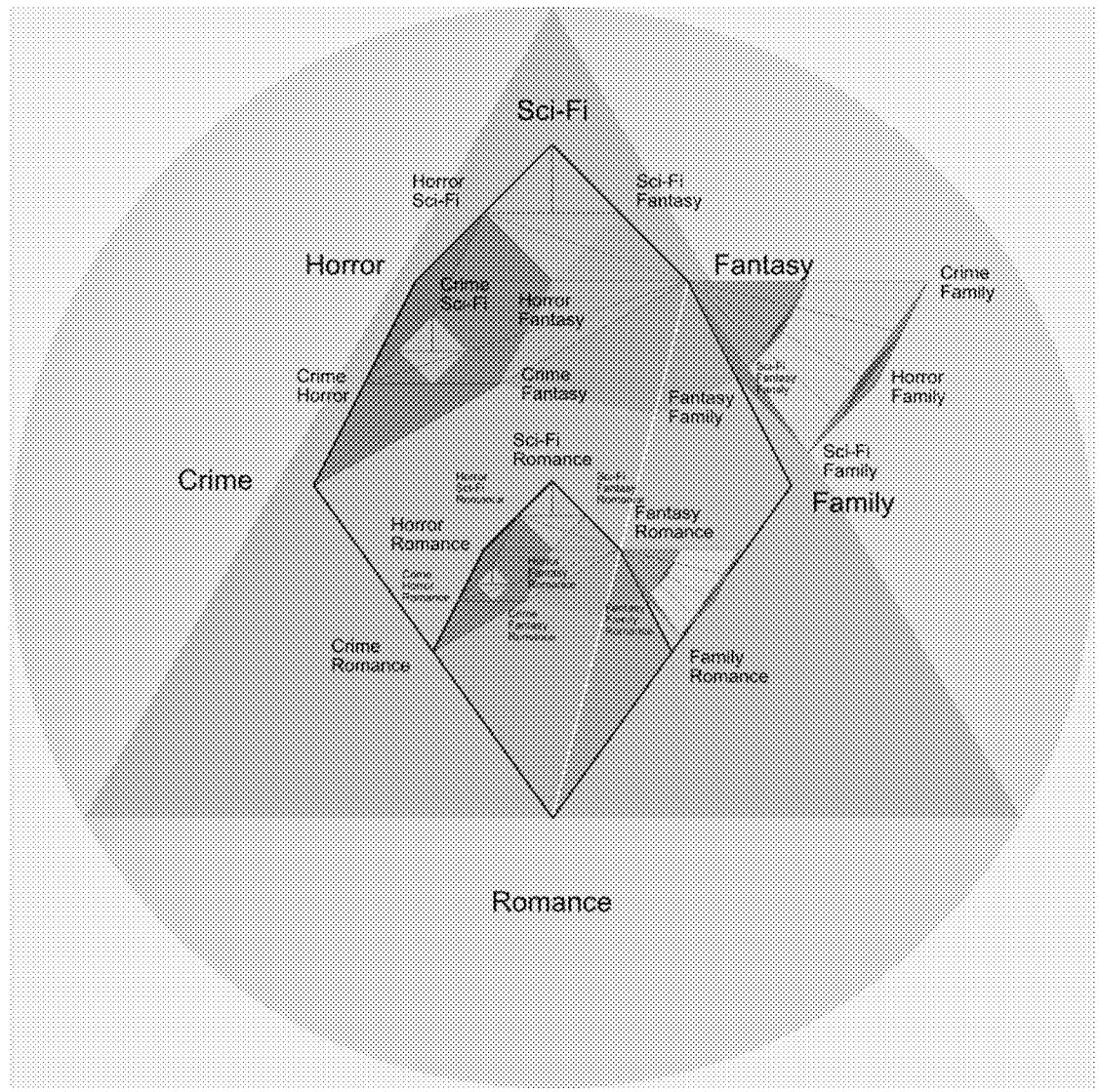
FIG. 26 illustrates how the portion of the pictograph in FIG. 25 can be part of a larger pictograph.

Manipulation of a pictograph can also involve creating and positioning icons to represent complex descriptors 18, without manipulating all or some part of the frame of the initial pictograph 100. A reflection method can be used to duplicate a subset of icons 130 that can be used to represent complex descriptors. With this method, illustrated for example in FIGS. 17A and 17B, one or a subset of icons 130 on an initial pictograph can be reflected to position duplicates of those icons directly opposite to the original icons, and between or in proximity to one or more other icons. In the example, in FIG. 17A, a subset of the icons 130 has been reflected 180° to create duplicates on the right side of the original pictograph. The reflected duplicate subset of icons 132 can then represent complex descriptors comprising their initial descriptor in combination with the one or more descriptors towards which they were reflected. FIG. 17B shows an enlarged view of the subset of icons 130 and the reflected subset 132, which form a propeller-shaped area on a pictograph FIG. 25 shows and example of how multiple subsets can be reflected and to create a more complete pictograph, such as shown, for example, in the partial pictograph in FIG. 26.

Figure 24:
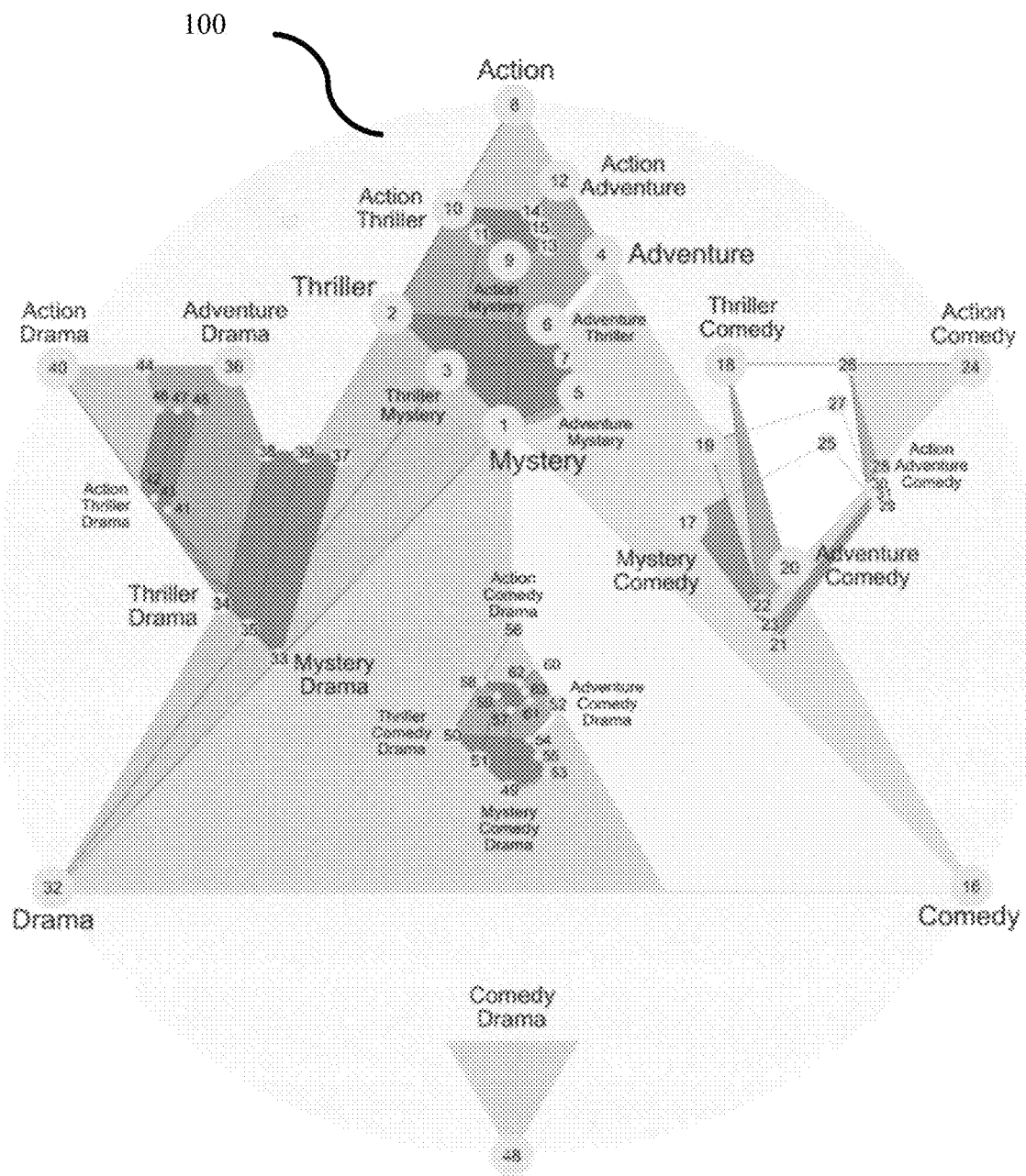
FIG. 24 shows one embodiment of a complete pictograph design, according to embodiments of the subject invention, which can be utilized for a movie library. In this example, the Triangulation, reflection, rotation, and midpoint methods have been utilized to position icons on the pictograph.

With the rotation method, all or part of a pictograph, including all or part of the frame and all or a subset of icons, can be rotated or turned around a point on the pictograph to create a duplicate frame and duplicate set of icons. A portion of the pictograph (subset of icons) can be rotated to any desired angle that provides adequate spacing or improves clarity in the pictograph. FIG. 24 illustrates an example of a pictograph on which the rotation method was employed to locate icons for complex descriptors on either side of the Action icon. In one embodiment, the subset of icons is rotated plus 60° (towards Comedy) and minus 60° (towards Drama). The initial pictograph is a triangle on which icons are positioned, as described above, using the SAR and Triangulation Method.

Figure 14:
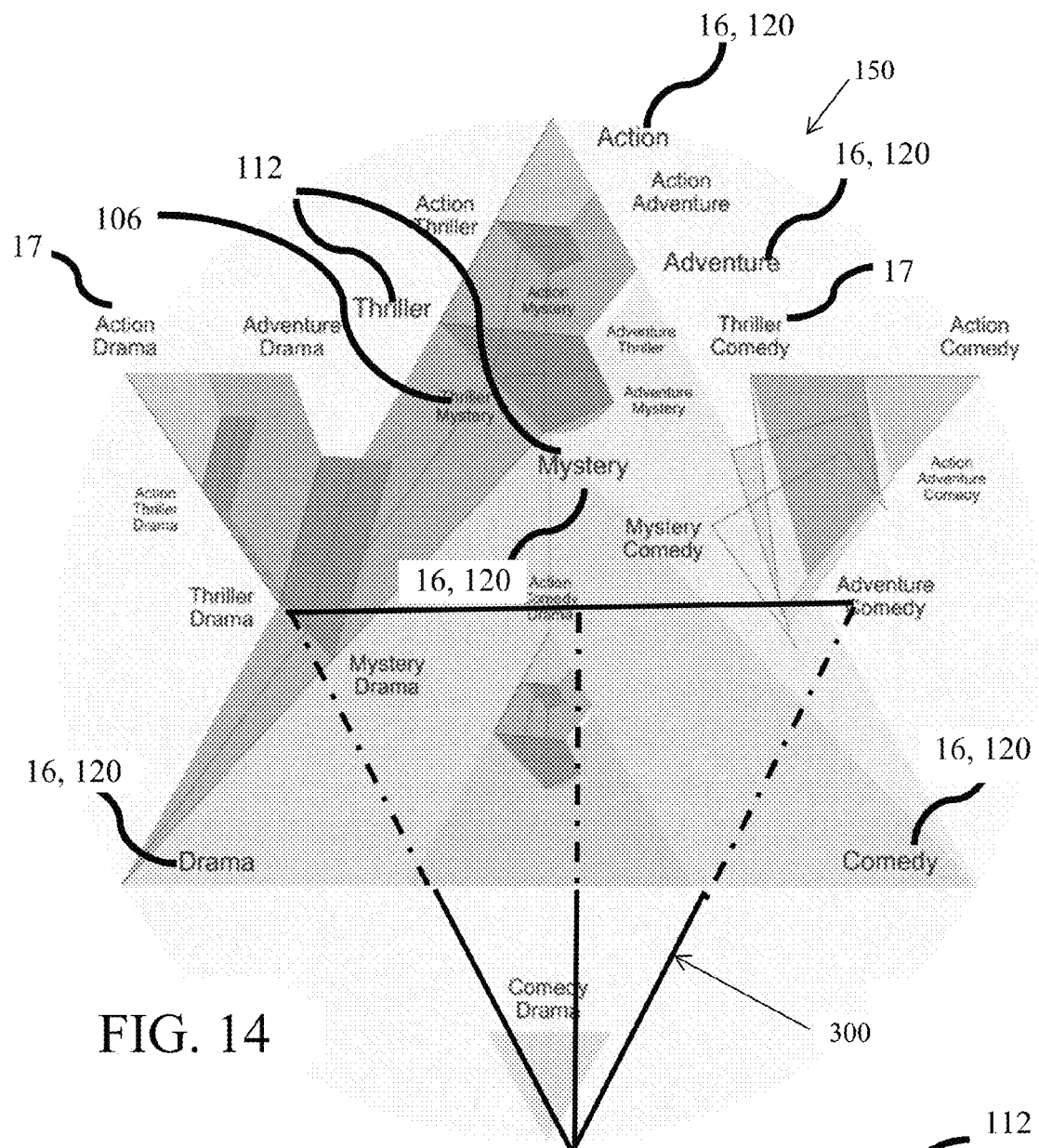
FIG. 14 illustrates one embodiment of a complex 3-dimensional pictograph obtained by manipulation of one or more other pictographs.
Figure 15A:
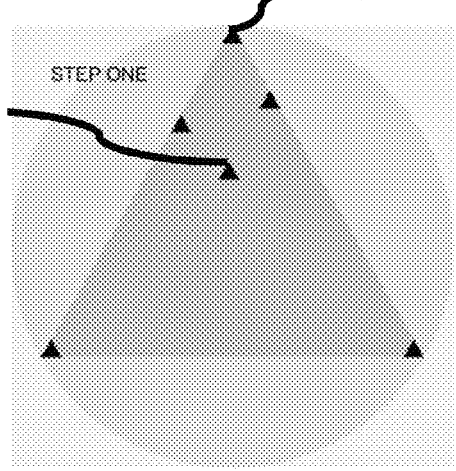
FIGS. 15A and 15B illustrate an example of the Midpoint method.
Figure 15B:
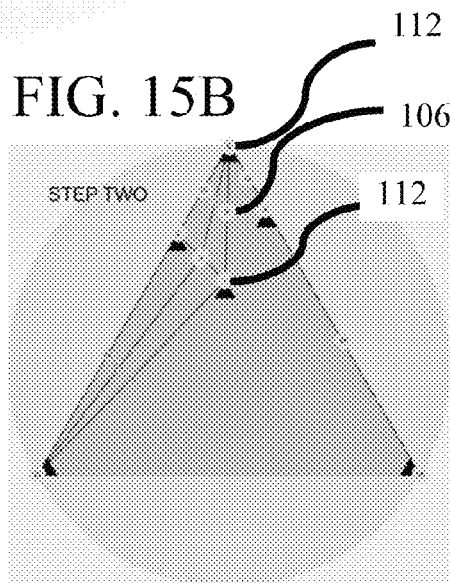

Another method of positioning icons for complex descriptors on a pictograph involves a Midpoint Method of geometric transformation. The Midpoint Method is based on determining a midpoint between two icons, which can be referred to as endpoint icons 112. A complex icon 106 can be positioned at the midpoint to represent a combination of the descriptors represented by the two endpoint icons, thereby creating a complex icon that represents a complex descriptor. For example, calculating the midpoint between an endpoint icon representing descriptor A and an endpoint icon representing descriptor B can position an icon at the midpoint representing complex descriptor AB. In a further example, calculating a midpoint between the icon for complex descriptor AB and the icon for descriptor C can position an icon that represents complex descriptor ABC. FIG. 14 shows a non-limiting example of a pictograph developed with the midpoint method to create complex descriptors. In this example, it can be seen that a pictograph can be created on which multiple icons have been previously positioned with the SAR and AA methods discussed above. The midpoint method can be used to position a complex descriptor between any two of these icons. FIGS. 15A and 15B illustrate an example of the midpoint method. In this example, a subset of the icons shown in FIG. 14 is used in FIG. 15A to demonstrate the midpoint method. In FIG. 15B, a line can be seen between several pairs of endpoint descriptors 112 and a complex icon 106 is located at the midpoint of each line, which represents a complex descriptor comprising the descriptors represented by the endpoint icons. So, using FIG. 14 as a reference, it can be seen in FIG. 15B that the complex icon between the Action icon and the Mystery icon would represent an Action-Mystery descriptor, which is also shown in FIG. 14. Likewise, the complex icon between the Thriller icon and the Drama icon would represent the Thriller-Drama complex icon, shown in FIG. 14.

Figure 16:
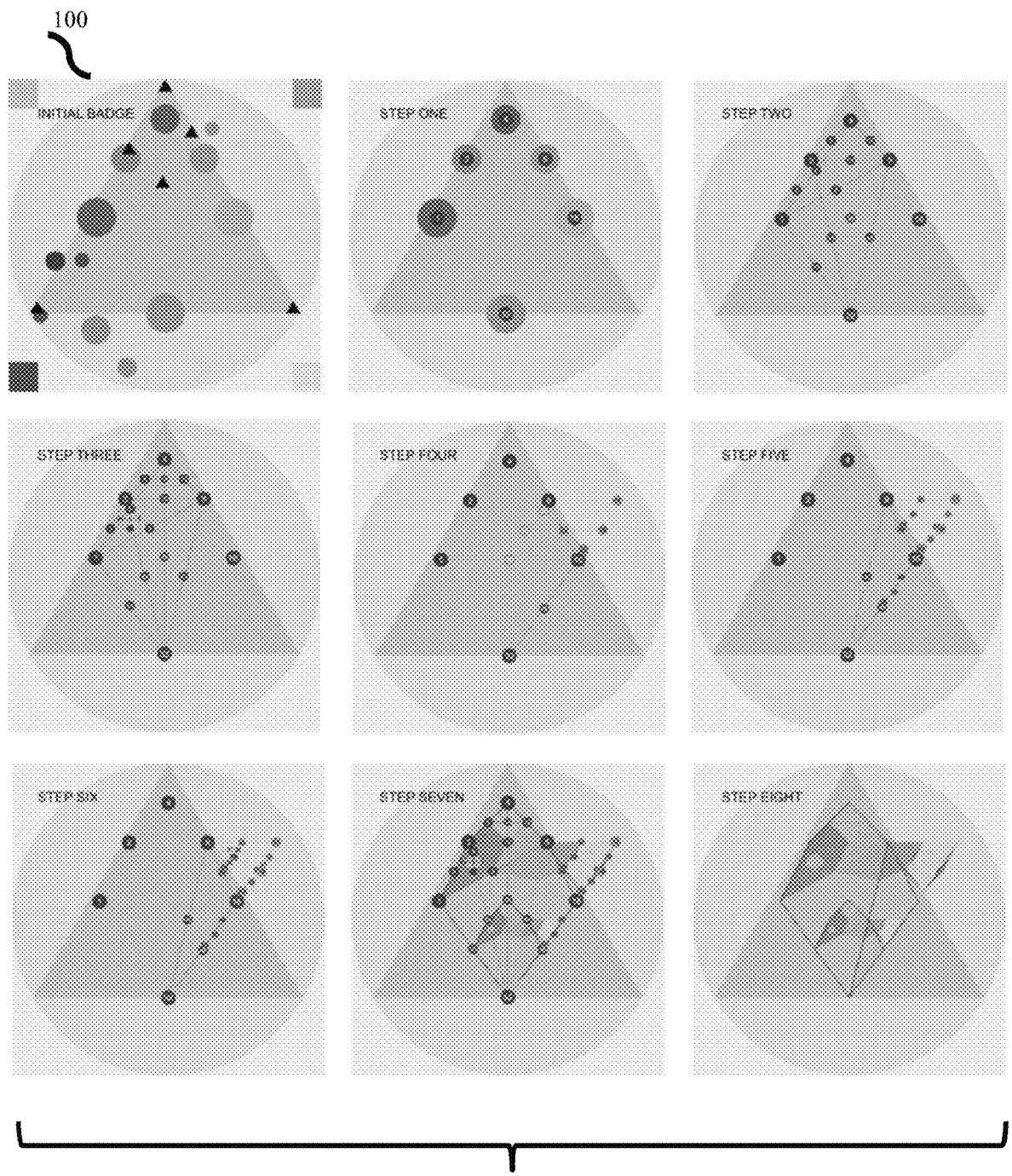
FIG. 16 illustrates the steps for performing reflection and midpoint methods of manipulation for creating duplicate icons on a pictograph representing complex descriptors.

As demonstrated above, multiple geometric manipulations can be performed on a pictograph. FIG. 16 illustrates a stepwise procedure wherein an initial pictograph is manipulated using the Midpoint Method along with the reflection method to create a complex 2-D or 3-Dimensional pictograph.

In another embodiment, two or more 3-dimensional pictographs can be combined with one or more intersecting faces. With this embodiment, the two or more pictographs can have similar vertices that can be aligned or similarly oriented, as described above, such that one or more faces intersect. FIG. 14 illustrates an example of a computer-generated complex 3-dimensional pictograph that has an intersecting tetrahedron pictograph 300 below (intersection indicated by the dot-dash line) another tetrahedron pictograph 300. In this example, the intersecting pictograph 300 shares three icons 105 with the pictograph above. It will be appreciated that 3-dimensional pictographs can be intersected or aligned in a variety of configurations. Such variations are within the scope of the subject invention.

Figure 18:
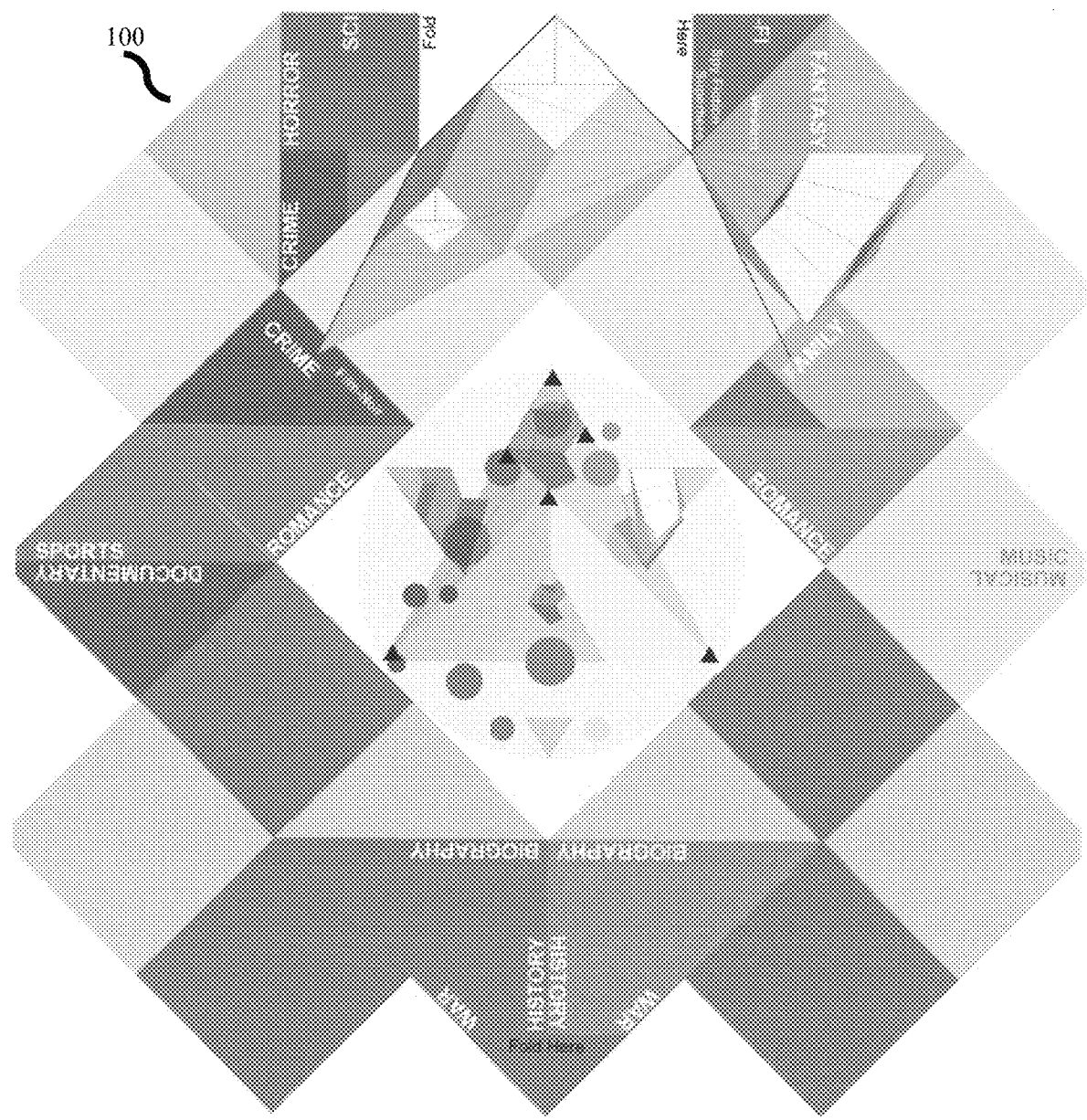
FIG. 18 illustrates an expanded 2-dimensional pictograph that can be manipulated to create a complex 3-dimensional pictograph.
Figure 19A:
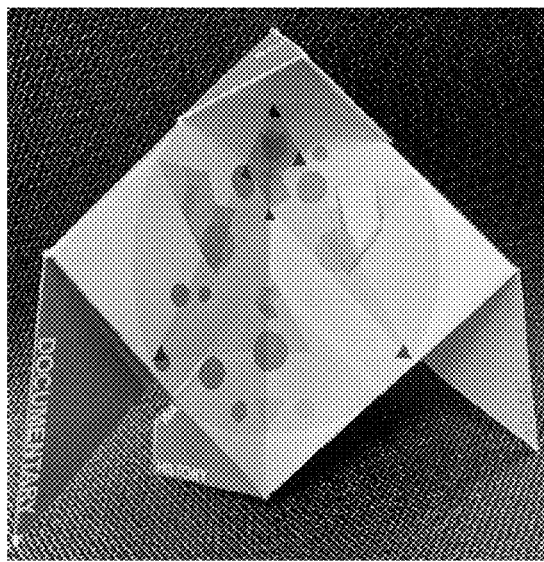
FIGS. 19A, 19B, 19C and 19D are photographs of different sides of an embodiment of a complex 3-dimensional pictograph created by manipulating the expanded 2-dimensional pictograph in FIG. 18.
Figure 19B:
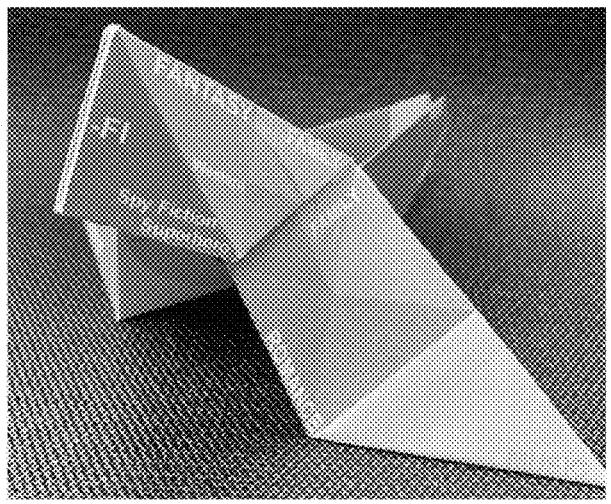
Figure 19C:
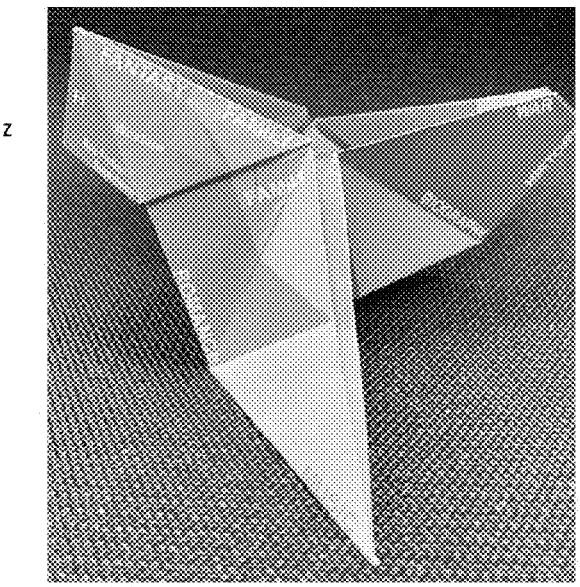
Figure 19D:
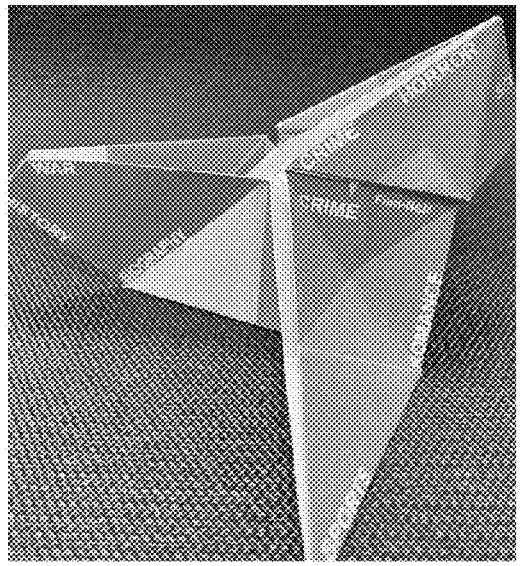

In a specific embodiment, an expanded 2-dimensional pictograph can be created, as described above. In a further specific embodiment, the vertices can be configured so that a plurality of equilateral triangles can be combined to form an expanded 2-dimensional pictograph with a square-shape or square-outline, such as shown, for example, in FIG. 18. It can be seen in this example, that the triangles 114 are combined similarly to those in FIG. 12. In a further embodiment, the expanded 2-dimensional pictograph, such as the one shown in FIG. 18, is manipulated by folding and/or bending along the legs of various triangles to create a complex 3-dimensional origami-type pictograph construct. In one embodiment, the manipulated 2-dimensional pictograph creates a 3-dimensional object that is a pictograph construct. FIGS. 19A, 19B, 19C, ad 19D illustrate a non-limiting example of 3-dimensional pictograph constructs obtained by manipulation of a 2-dimensional pictograph shown in FIG. 18. Alternatively, where the complex 2-dimensional pictograph is a computer-generated image, a complex 3-dimensional pictograph can be created on an electronic screen. In one embodiment, a 3-dimensional pictograph can be created on an electronic screen by manipulating or modifying a computer-generated 2-dimensional pictograph. A complex 3-dimensional pictograph could also resemble an origami-type pictograph, such as shown in FIGS. 19A-19D. A person of skill in the art would understand how to create a computer-generated 3-dimensional pictograph from a 2-dimensional pictograph. Whether a tangible object or computer-generated image, a pictograph can represent the composition and the relationship between items in the media library.

An electronic or computer-generated pictograph can be further engendered with the characteristics of a search tool for locating items in a media library. In a one embodiment, the items 12 in a media library 10 are listed in in a database 175. In a further embodiment, each item in the database is further associated with the tagged respective descriptors 14. For example, the items in the media library in FIG. 2 can be represented in a database that includes the respective descriptors for each item. In a still further embodiment, each item can be associated with a symbol 177 that can be unique to each item, such as, for example, a picture, text, sound, some other characteristic, or combination thereof that represents an item. By way of a non-limiting example, items in a media library of movies can be represented by an image of the advertising or movie poster associated with the movie. The ability to generate database of items in a media library, associated with their respective descriptors and symbol, is within the skill of a person trained in the art having benefit of the subject invention.

In one embodiment, an electronic database, accessible with a computer, contains a list of items in a media library and the descriptors associated therewith. In a further embodiment, the descriptors 14 used to tag the items in the electronic database 175 are further associated with the respective icons 105 utilized on a pictograph 100. In a further embodiment, the association between a descriptor and icon further associates items tagged with that descriptor to the icon.

The ability to determine what items are in a media library can be limited by the options available for searching in the media library. The relatedness or similarities between items in a media library can also be limited by the information available for each item and the ability of the search methodology and tools available. The embodiments of the subject invention provide an improvement to the selection tools utilized for targeting and/or locating specific items in a media library. Specifically, embodiments of the subject invention provide a graphical representation of at least a portion of the composition or content of a media library. Items in a media library are often tagged with various types of information or data related to various characteristics, statistics, and other data about the media item. In one embodiment, that information is utilized from each item to create a pictograph on which the information tagged to items in a media library is represented in a manner that indicates relatedness among certain descriptors with regard to the items in a media library. In a further embodiment, the pictograph is used as a selection tool for locating one or more items in a media library. In a yet further embodiment, an icon or other point on the pictograph can be selected to obtain a list of the items in the media library tagged with the descriptor associated with the icon. One or more icons can be selected and the items tagged with the descriptors associated with the selected icons can be presented as a list on the same or a different screen than the pictograph.

A further improvement to the selection tools used with a media library is the presentation of a badge 200. A badge can be derived from and can resemble a pictograph. A badge can include at least the specific descriptors tagged to the item. Utilizing badges associated with items, a user can associate badges with items of interest. Both a pictograph and a badge provide a unique advantage in that they illustrate information about a media library and the items therein in a way that can be more easily understood and assimilated than other types of non-graphical information. It can also provide a way to select multiple related items.

Figure 20A:
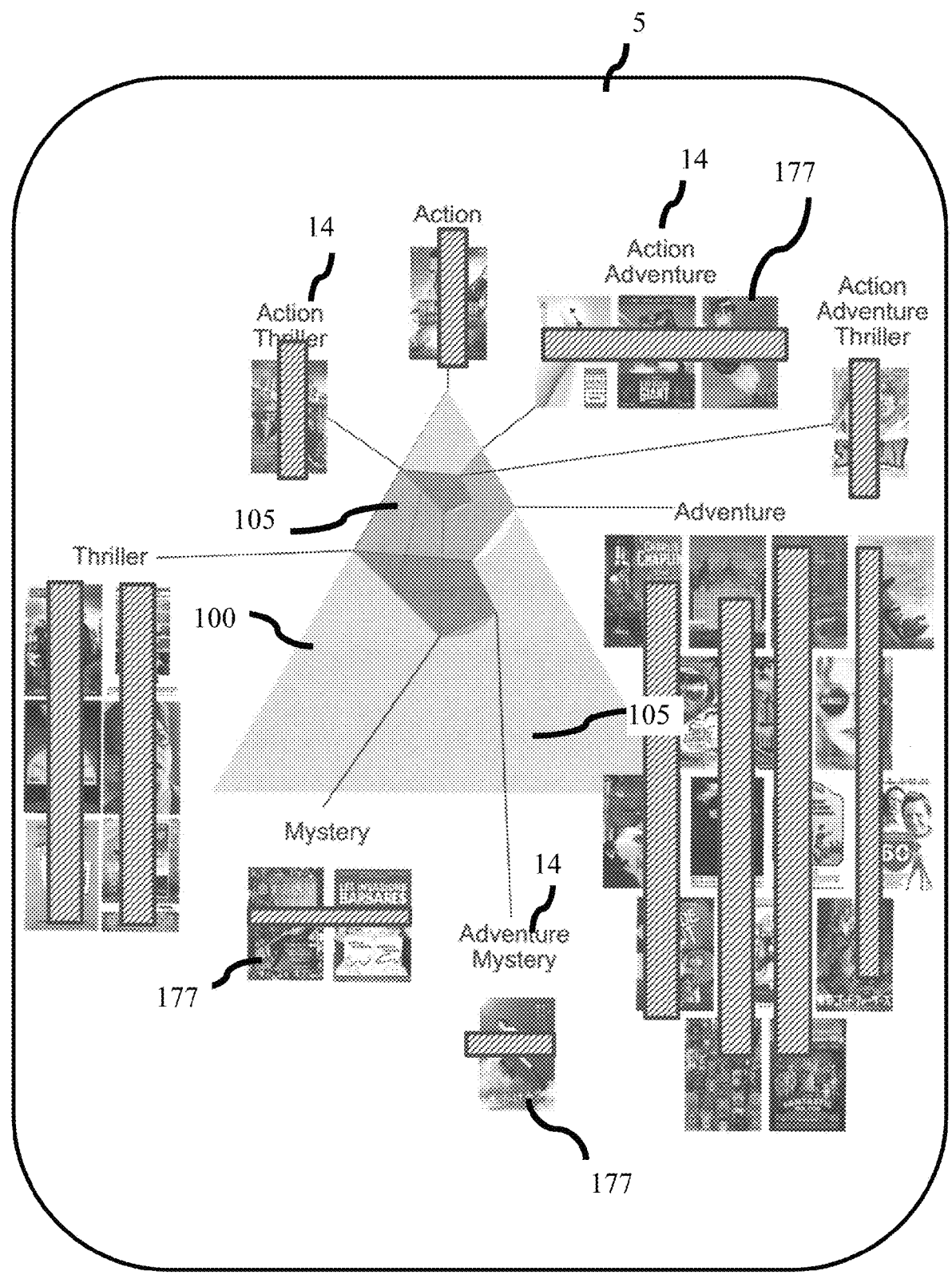
FIGS. 20A and 20B illustrate portions of a pictograph, according to the embodiments of the subject invention, presented on an electronic screen that can be used as a selection tool. As shown in these Figures, selecting one or more an icons or areas on the pictograph can present items on the screen from the media library, represented by the pictograph, which are tagged with the descriptor associated with the one or more icons or areas.
Figure 20B:
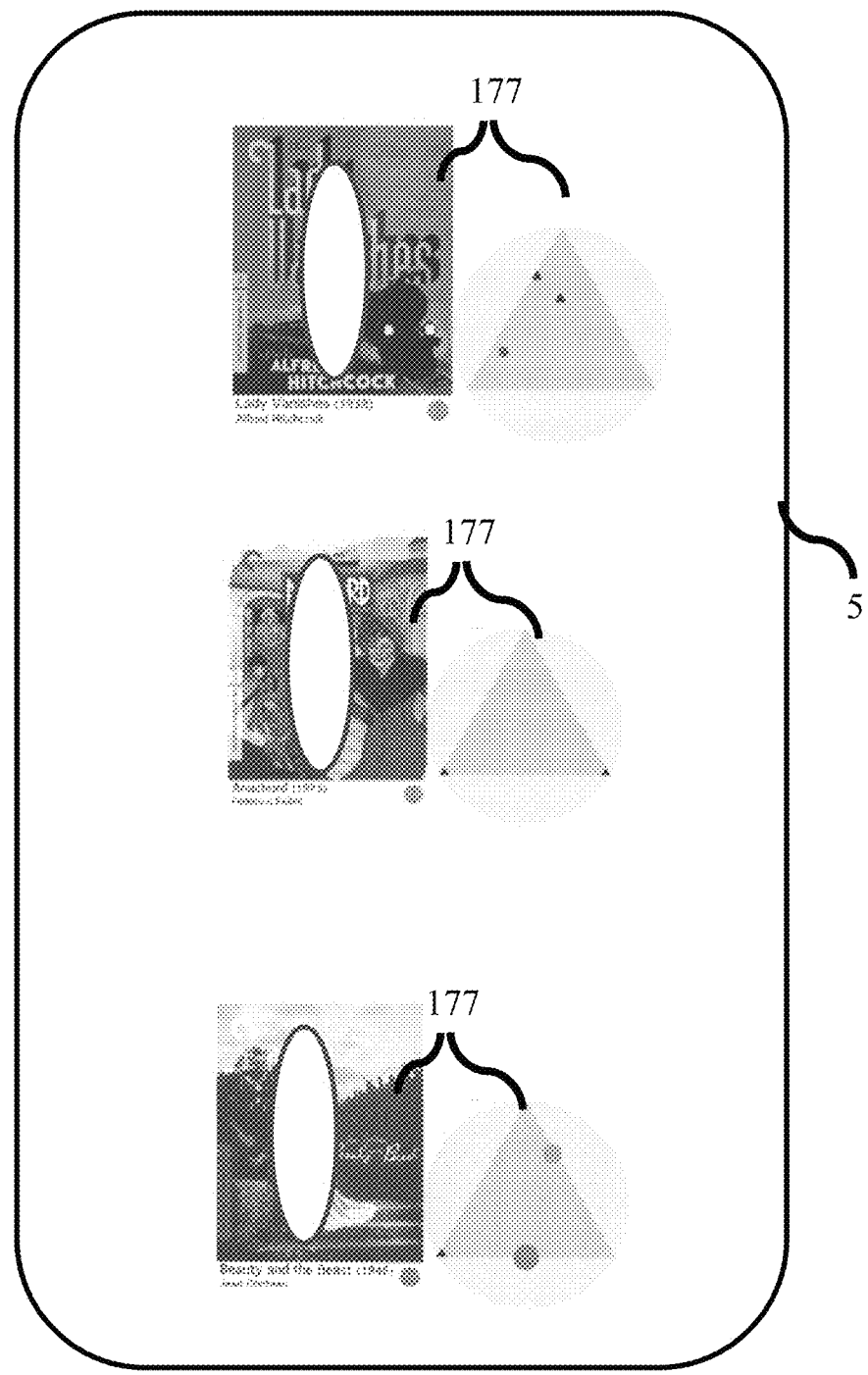

FIG. 19 shows a portion of the pictograph 100 in FIG. 14 with icons 105 that represent descriptors 14. Also shown in FIG. 19 is one example of symbols 177 associated with each item in the media library tagged with the respective descriptor and that can be presented by selecting one or more icons on the pictograph. FIG. 20A shows an alternative layout for presenting the items associated with one or more icons.

From the description above, it will be understood that each item 12 in a media library 10 is tagged with one or more descriptors 14. The descriptors are associated with icons 105 on a pictograph 100. While a pictograph can include icons for some or all of the descriptors utilized for a media library, each item 12 will typically be associated with one or more, or a subset 210, of the icons. In one embodiment, the icons associated with a particular item are used to create a badge 200 that includes only those descriptors tagged to the item. Stated another way, a badge can include only the icons associated with an item. Thus, a badge having one or a subset of the icons can provide information regarding the particular characteristics of the item. FIG. 18 shows examples of badges with one or more icons representing the descriptors tagged to the item. Also shown is a symbol of the item, which can convey additional information.

Figure 21A:
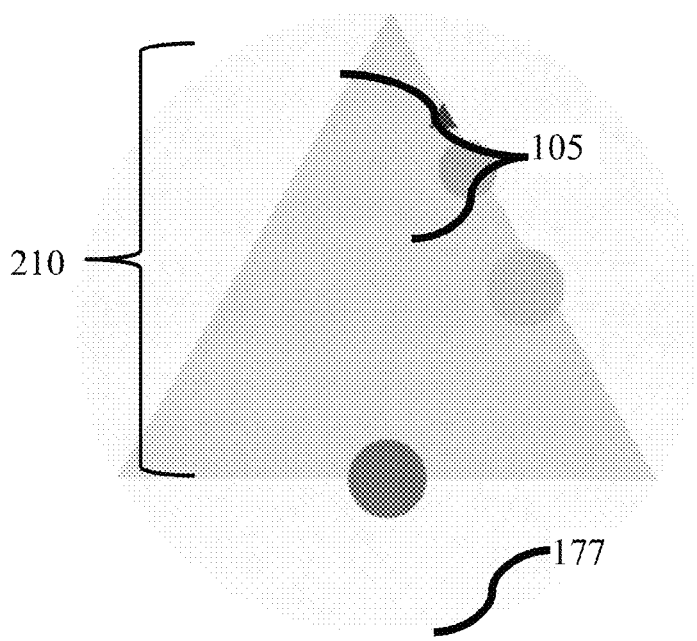
FIGS. 21A, 21B and 21C illustrate examples of badges, according to an embodiment of the subject invention, which represent a simplified pictograph having the icons associated with a particular item.
Figure 21B:
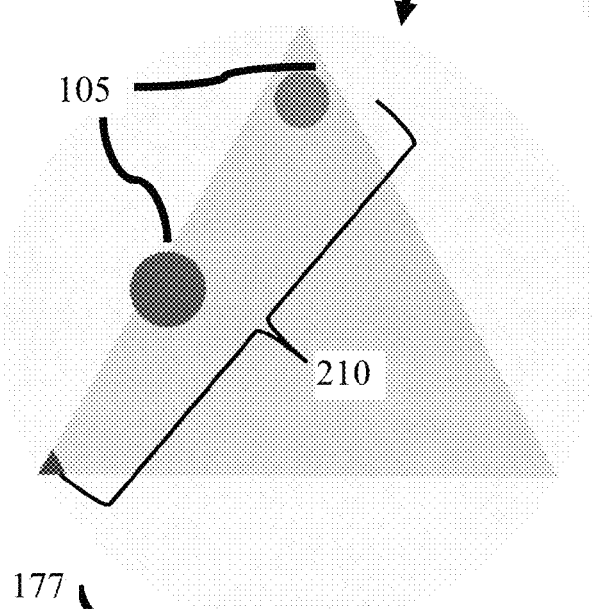
Figure 21C:
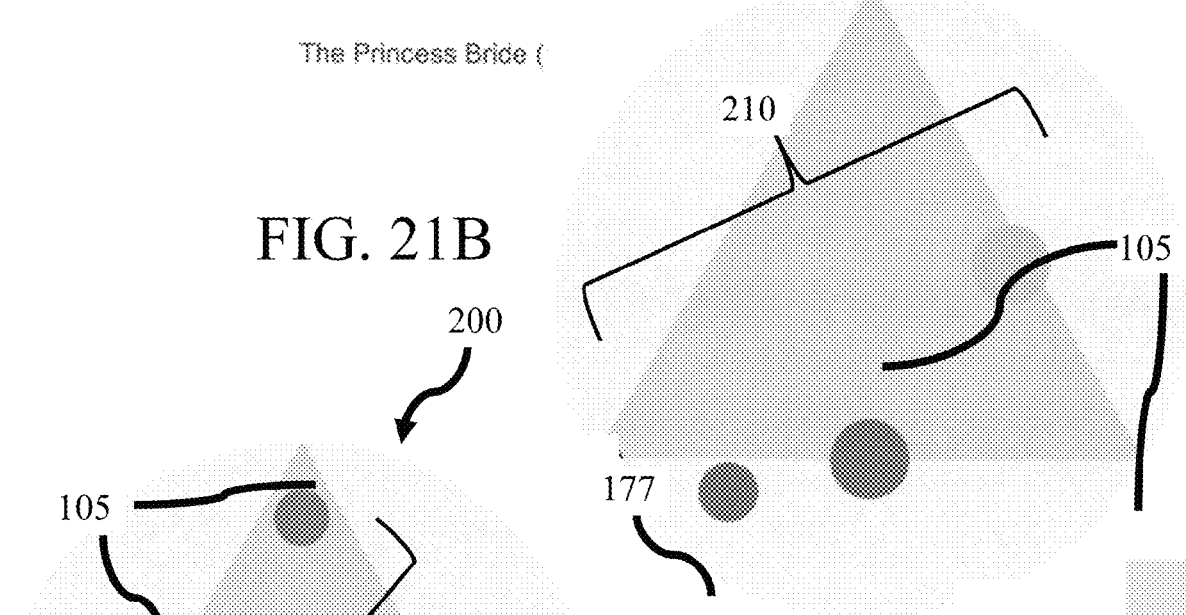

In one embodiment, the frame 113 of a pictograph forms the basis for a badge on which the icons relevant to the item are positioned as described above for a media library pictograph. Thus, only those icons representing descriptor tagged to the selected item can be positioned on a frame to create a badge. In an alternative embodiment, a badge is created by removing from a pictograph those icons representing descriptors that are not tagged to the items. The resulting pictograph can provide a badge that includes a subset of icons representing descriptors that are tagged to the respective item. In a further embodiment, a badge 200 includes an outline or other representation of the general triangular pictograph utilized for the media library in which the item can be found. With this embodiment, the badge for an item will resemble the frame 113 of the pictograph and can have only the icons associated with the item in the same positions as on pictograph of the media library. FIGS. 21A, 21B, and 21C illustrate examples of badges for three different items 12, based on the pictograph in FIG. 1. As shown in FIGS. 17 and 18, this type of badge can also be located near the symbol used for an item to convey additional information about the item.

Media libraries can comprise numerous items with various qualitative and quantitative characteristics. Embodiments of the subject invention provide devices and methods for locating one or more items in the media library utilizing the qualitative and/or quantitative characteristics by utilizing a pictograph. A pictograph can be prepared utilizing the Strength of Association Ratio calculated between various descriptors used to define items in the media library. The Strength of Association ratio can be further utilized to calculate Angles of Association used in a Triangulation Method for positioning icons on the pictograph that represent the composition of items in the media library. In certain embodiments, the pictograph can be used as a selection tool for items in the media library. The embodiments of the subject invention provide an improvement to media libraries and selection tools utilized for targeting and/or locating specific items in a media library.

The scope of the invention is not limited by the specific examples and suggested procedures and uses related herein since modifications can be made within such scope from the information provided by this specification to those skilled in the art.

All patents, patent applications, provisional applications, and other publications referred to or cited herein are incorporated by reference in their entirety, including all figures and tables, to the extent they are not inconsistent with the explicit teachings of this specification. Additionally, the entire contents of the references cited within the references cited herein are also entirely incorporated by reference.

Any reference in this specification to "one embodiment," "an embodiment," "example embodiment," "further embodiment," "alternative embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

The invention has been described herein in considerable detail, in order to comply with the patent Statutes and to provide those skilled in the art with information needed to apply the novel principles, and to construct and use such specialized components as are required. However, the invention can be carried out by specifically different equipment and devices, and that various modifications, both as to equipment details and operating procedures can be effected without departing from the scope of the invention itself. Further, although the present invention has been described with reference to specific details of certain embodiments thereof and by examples disclosed herein, it is not intended that such details should be regarded as limitations upon the scope of the invention except as and to the extent that they are included in the accompanying claims.

The invention claimed is:

1. A computer-implemented method, for generating a pictograph, adapted to be viewed on a screen, representing at least a portion of the composition of a database, the computer-implemented method comprising:
   a) obtaining access to the database, wherein the database comprises one or more items tagged with one or more descriptors;
   b) tallying the number of items tagged with each of the one or more descriptors;
   c) generating a frame comprising at least three legs that define
      a First vertex having an angle of about 60° and representing a first descriptor tagged to one or more items,
      a Second vertex having an angle of about 60° and representing a second descriptor tagged to the one or more items,
      a Third vertex having an angle of about 60° and representing a third descriptor tagged to the one or more items,
   d) determining a position on the frame for an icon representing at least one other descriptor by calculating a Strength of Association Ratio (SAR) for the at least one other descriptor, relative to each of the First Vertex, Second vertex, and Third vertex, as follows:

$$\text{Strength of Association Ratio} = (CD - AC - BC + C^2)/(AB - AC - BC + C^2) \quad \text{(Equation 1)}$$

wherein,
   A=a number of one or more items in the database tagged with the descriptor represented at one of the First vertex, the Second vertex, or the Third vertex,
   B=a number of one or more items in the database tagged with the at least one other descriptor,
   C=a number of one or more items tagged with both the descriptor represented at the vertex used for A and the at least one other descriptor,
   D=a total number of items in the database,
   e) calculating an Angle of Association for at least two of the descriptors represented at the First vertex, Second vertex and Third vertex by utilizing the respective calculated SAR in at two Angle of Association Equations, as follows:

First Angle of Association $(\angle A')=(60\times C)/(B+C)$ (Equation 2),

Second Angle of Association $(\angle B')=(60\times C)/(A+C)$ (Equation 3),

Third Angle of Association $(\angle C')=(60\times B)/(A+B)$ (Equation 4)

wherein,
A=SAR calculated for the descriptor represented at the First vertex and the least one other descriptor,
B=SAR calculated for descriptor represented at the Second vertex and the at least one other descriptor,
C=SAR calculated for descriptor represented at the Third vertex and the at least one other descriptor,
f) measuring the Angles of Association from the at least two vertexes representing the descriptors utilized in the respective Angle of Association equations;
g) positioning the icon, representing the at least one other descriptor, on the frame where the Angles of Association intersect; and
h) repeating steps d—g.

2. The computer-implemented method according to claim 1, further comprising associating with each icon positioned on the frame the one or more items in the database tagged with the at least one other descriptor represented by the icon.

3. The computer-implemented method according to claim 2, further comprising presenting a list of the items associated with the icon when the icon is selected.

4. The computer-implemented method according to claim 2, further comprising:
generating a badge for a listed item by generating a pictograph that includes one or more icons representing descriptors that are tagged to the item, such that the badge comprises icons selected from the icons positioned on the frame of the pictograph.

5. The computer-implemented method according to claim 4, wherein the badge is provided for at least one item in the list of items.

6. The computer-implemented method according to claim 1, further comprising positioning on the pictograph at least one icon representing a complex descriptor utilizing at least one of a reflective method, a rotation method, and a midpoint method.

7. The computer-implemented method according to claim 1, wherein the frame is 2-dimensional.

8. The computer-implemented method according to claim 7, wherein the 2-dimensional frame is manipulated to be a 3-dimensional frame.

9. The computer-implemented method according to claim 5, wherein the database comprises a media library.

10. A non-transitory computer-readable storage medium comprising instructions for generating a pictograph that represents at least a portion of the composition of an electronic database, the storage medium comprising instructions for:
a) accessing the electronic database, wherein the electronic database comprises one or more items tagged with one or more descriptors;
b) tallying the number of items tagged with each of the one or more descriptors;
c) generating a frame comprising at least three legs that define
a First vertex having an angle of about 60° and representing a first descriptor tagged to one or more items,
a Second vertex having an angle of about 60° and representing a second descriptor tagged to the one or more items,
a Third vertex having an angle of about 60° and representing a third descriptor tagged to the one or more items,
d) determining a position on the frame for an icon representing at least one other descriptor by calculating a Strength of Association Ratio (SAR) for the at least one other descriptor, relative to each of the First Vertex, Second vertex, and Third vertex, as follows:

Strength of Association Ratio$=(CD-AC-BC+C^2)/(AB-AC-BC+C^2)$ (Equation 1)

wherein,
A=a number of one or more items in the database tagged with the descriptor represented at one of the First vertex, the Second vertex, or the Third vertex,
B=a number of one or more items in the database tagged with the at least one other descriptor,
C=a number of one or more items tagged with both the descriptor represented at the vertex used for A and the at least one other descriptor,
D=a total number of items in the database,
e) calculating an Angle of Association for at least two of the descriptors represented at the First vertex, Second vertex and Third vertex by utilizing the respective calculated SAR in at two Angle of Association Equations, as follows:

First Angle of Association $(\angle A')=(60\times C)/(B+C)$ (Equation 2),

Second Angle of Association $(\angle B')=(60\times C)/(A+C)$ (Equation 3),

Third Angle of Association $(\angle C')=(60\times B)/(A+B)$ (Equation 4)

wherein,
A=SAR calculated for the descriptor represented at the First vertex and the least one other descriptor,
B=SAR calculated for descriptor represented at the Second vertex and the at least one other descriptor,
C=SAR calculated for descriptor represented at the Third vertex and the at least one other descriptor,
f) measuring the Angles of Association from the at least two vertexes representing the descriptors utilized in the respective Angle of Association equations;
g) positioning the icon, representing the at least one other descriptor, on the frame where the Angles of Association intersect; and
h) repeating steps d—g.

11. The storage medium according to claim 10, further comprising associating with each icon positioned on the frame the one or more items in the database tagged with the at least one other descriptor represented by the icon.

12. The storage medium according to claim 11, further comprising presenting a list of the items associated with the icon when the icon is selected.

13. The storage medium according to claim 11, further comprising:
generating a badge for a listed item by generating a pictograph that includes one or more icons representing descriptors that are tagged to the item, such that the badge comprises icons selected from the icons positioned on the frame of the pictograph.

14. The storage medium according to claim 13, wherein the badge is provided for at least one item in the list of items.

15. The storage medium according to claim 10, further comprising positioning on the pictograph at least one icon representing a complex descriptor utilizing at least one of a reflective method, a rotation method, and a midpoint method.

16. The storage medium according to claim 10, wherein the frame is 2-dimensional.

17. The storage medium according to claim 16, wherein the 2-dimensional frame is manipulated to be a 3-dimensional frame.

18. A method for generating a pictograph, configured to be viewed on a screen, representing at least a portion of the composition of a database, the method comprising:
   a) tallying a number of items, within the database, tagged with each of a one or more descriptors;
   b) generating a frame comprising at least three legs that define
      a First vertex having an angle of about 60° and representing a first descriptor tagged to one or more items,
      a Second vertex having an angle of about 60° and representing a second descriptor tagged to the one or more items,
      a Third vertex having an angle of about 60° and representing a third descriptor tagged to the one or more items,
   c) determining a position on the frame for an icon representing at least one other descriptor by calculating a Strength of Association Ratio (SAR) for the at least one other descriptor, relative to each of the First Vertex, Second vertex, and Third vertex, as follows:

Strength of Association Ratio=$(CD-AC-BC+C^2)/(AB-AC-BC+C^2)$  (Equation 1)

wherein,
   A=a number of one or more items in the database tagged with the descriptor represented at one of the First vertex, the Second vertex, or the Third vertex,
   B=a number of one or more items in the database tagged with the at least one other descriptor,
   C=a number of one or more items tagged with both the descriptor represented at the vertex used for A and the at least one other descriptor,
   D=a total number of items in the database,
   d) calculating an Angle of Association for at least two of the descriptors represented at the First vertex, Second vertex and Third vertex by utilizing the respective calculated SAR in at two Angle of Association Equations, as follows:

First Angle of Association $(\angle A')=(60\times C)/(B+C)$  (Equation 2),

Second Angle of Association $(\angle B')=(60\times C)/(A+C)$  (Equation 3),

Third Angle of Association $(\angle C')=(60\times B)/(A+B)$  (Equation 4)

wherein,
   A=SAR calculated for the descriptor represented at the First vertex and the least one other descriptor,
   B=SAR calculated for descriptor represented at the Second vertex and the at least one other descriptor,
   C=SAR calculated for descriptor represented at the Third vertex and the at least one other descriptor,
   e) measuring the Angles of Association from the at least two vertexes representing the descriptors utilized in the respective Angle of Association equations;
   f) positioning the icon, representing the at least one other descriptor, on the frame where the Angles of Association intersect; and
   g) repeating steps c—f.

19. The method according to claim 18, wherein the database is an electronic database and the method further comprises accessing the electronic database.

20. The method according to claim 18, further comprising associating with each icon positioned on the frame the one or more items in the database tagged with the at least one other descriptor represented by the icon.

21. The method according to claim 20, further comprising presenting a list of the items associated with the icon when the icon is selected.

22. The method according to claim 20, further comprising:
   generating a badge for a listed item by generating a pictograph that includes one or more icons representing descriptors that are tagged to the item, such that the badge comprises icons selected from the icons positioned on the frame of the pictograph.

23. The method according to claim 22, wherein the badge is provided for at least one item in the list of items.

24. The method according to claim 23, wherein the database is an electronic database that comprises the one or more items tagged with the one or more descriptors and the method further comprises accessing the electronic database.

25. The method according to claim 18, further comprising positioning on the pictograph at least one icon representing a complex descriptor utilizing at least one of a reflective method, a rotation method, and a midpoint method.

26. The method according to claim 18, wherein the frame is 2-dimensional.

27. The method according to claim 26, wherein the 2-dimensional frame is manipulated to be a 3-dimensional frame.

\* \* \* \* \*